(12) United States Patent
Johnson et al.

(10) Patent No.: US 10,565,853 B2
(45) Date of Patent: Feb. 18, 2020

(54) CONTAINER WITH CONTENT MONITORING AND REPORTING CAPABILITIES

(71) Applicants: Sam Johnson, Largo, FL (US); Robert Leon, Miami, FL (US)

(72) Inventors: Sam Johnson, Largo, FL (US); Robert Leon, Miami, FL (US)

(73) Assignee: Sam Johnson, Largo, FL (US)

( * ) Notice: Subject to any disclaimer, the term of this patent is extended or adjusted under 35 U.S.C. 154(b) by 0 days.

(21) Appl. No.: 16/034,449

(22) Filed: Jul. 13, 2018

(65) Prior Publication Data

US 2018/0322769 A1 Nov. 8, 2018

Related U.S. Application Data

(63) Continuation of application No. 15/198,582, filed on Jun. 30, 2016, now Pat. No. 10,026,295, which is a continuation-in-part of application No. 15/057,289, filed on Mar. 1, 2016, which is a continuation of application No. 14/610,641, filed on Jan. 30, 2015, now Pat. No. 9,361,772, which is a continuation of application No. 13/933,101, filed on Jul. 1, 2013, now Pat. No. 8,976,036, which is a continuation of application No. 13/593,514, filed on Aug. 24, 2012, now Pat. No. 8,502,692, which is a continuation of application No. 12/503,065, filed on Jul. 14, 2009, now Pat. No. 8,279,076.

(51) Int. Cl.
| | | |
|---|---|---|
| G08B 21/00 | (2006.01) | |
| G08B 21/24 | (2006.01) | |
| G08B 13/06 | (2006.01) | |
| G06F 21/31 | (2013.01) | |
| A61J 7/04 | (2006.01) | |
| G08B 13/08 | (2006.01) | |
| G08B 21/18 | (2006.01) | |
| G08B 25/08 | (2006.01) | |

(52) U.S. Cl.
CPC .............. *G08B 21/24* (2013.01); *A61J 7/049* (2015.05); *A61J 7/0427* (2015.05); *G06F 21/31* (2013.01); *G08B 13/06* (2013.01); *G08B 13/08* (2013.01); *G08B 21/18* (2013.01); *G08B 25/08* (2013.01); *A61J 2200/70* (2013.01)

(58) Field of Classification Search
CPC ......... G08B 21/00; G08B 21/18; G08B 21/24
USPC ... 340/540, 5.8, 309.16, 309.4, 309.7, 309.8
See application file for complete search history.

(56) References Cited

U.S. PATENT DOCUMENTS

| | | | | |
|---|---|---|---|---|
| 5,014,798 A | * | 5/1991 | Glynn .................. | G01G 11/006 177/132 |
| 6,529,446 B1 | | 3/2003 | de la Huerga | |
| 6,822,554 B2 | | 11/2004 | Vrijens et al. | |

(Continued)

*Primary Examiner* — Toan N Pham
(74) *Attorney, Agent, or Firm* — Weide & Miller, Ltd.

(57) ABSTRACT

An activity monitor is associated with a container, such as a medication bottle, and includes one or more detectors configured to detect activity associated with the bottle, such as movement, opening and/or closing, and changes in volume and/or mass. The activity monitor may include alerting devices and be programmed with scheduling information. The activity monitor may also, or instead, communicate with one or more remote devices such as a user device or monitoring system, such as to receive programming information from those devices or to output activity information to those devices.

15 Claims, 19 Drawing Sheets

(56) References Cited

U.S. PATENT DOCUMENTS

| | | |
|---|---|---|
| 7,170,823 B2 | 1/2007 | Fabricius et al. |
| 7,359,765 B2 | 4/2008 | Varvarelis et al. |
| 7,454,267 B2 | 11/2008 | Bonney et al. |
| 7,553,234 B2 | 6/2009 | Walker et al. |
| 7,553,235 B2 | 6/2009 | Walker et al. |
| 7,821,404 B2 | 10/2010 | Walker et al. |
| 7,896,192 B2 | 3/2011 | Conley et al. |
| 7,928,835 B1 | 4/2011 | Jovanov et al. |
| 7,944,342 B2 | 5/2011 | Sekura |
| 7,993,055 B2 | 8/2011 | Nurse et al. |
| 8,069,056 B2 | 11/2011 | Walker et al. |
| 8,149,096 B2 | 4/2012 | Metry et al. |
| 8,279,076 B2 | 10/2012 | Johnson |
| 8,284,068 B2 | 10/2012 | Johnson |
| 8,391,104 B2 | 3/2013 | de la Huerga |
| 8,446,799 B2 | 5/2013 | Burke, Jr. et al. |
| 8,502,692 B2 | 8/2013 | Johnson |
| 8,536,987 B2 | 9/2013 | Metry et al. |
| 8,754,769 B2 | 6/2014 | Stein et al. |
| 8,854,225 B2 | 10/2014 | Johnson |
| 8,976,036 B2 | 3/2015 | Johnson |
| 9,125,798 B2 | 9/2015 | Stein et al. |
| 9,283,150 B2 | 3/2016 | Bujalski et al. |
| 9,358,183 B2 | 6/2016 | Stein et al. |
| 9,361,772 B2 | 6/2016 | Johnson |
| 9,361,780 B2 | 6/2016 | Burke, Jr. et al. |
| 9,740,828 B2 | 8/2017 | Chu |
| 2005/0187789 A1 | 8/2005 | Hatlestad et al. |
| 2008/0001737 A1 | 1/2008 | Metry |
| 2009/0223994 A1 | 9/2009 | Getz |
| 2010/0164716 A1* | 7/2010 | Estevez ............... G06F 19/3462 340/540 |
| 2010/0270527 A1 | 10/2010 | Wachman et al. |
| 2010/0328099 A1 | 12/2010 | Wachman et al. |
| 2012/0257478 A1 | 10/2012 | Marcellino |
| 2015/0145672 A1 | 5/2015 | Chu |
| 2015/0179032 A1 | 6/2015 | Johnson |
| 2016/0058661 A1 | 3/2016 | Pether et al. |
| 2016/0180693 A1 | 6/2016 | Johnson |
| 2016/0256357 A1 | 9/2016 | Stein et al. |
| 2018/0042817 A1 | 2/2018 | Wachman et al. |
| 2018/0046777 A1 | 2/2018 | Wachman et al. |

* cited by examiner

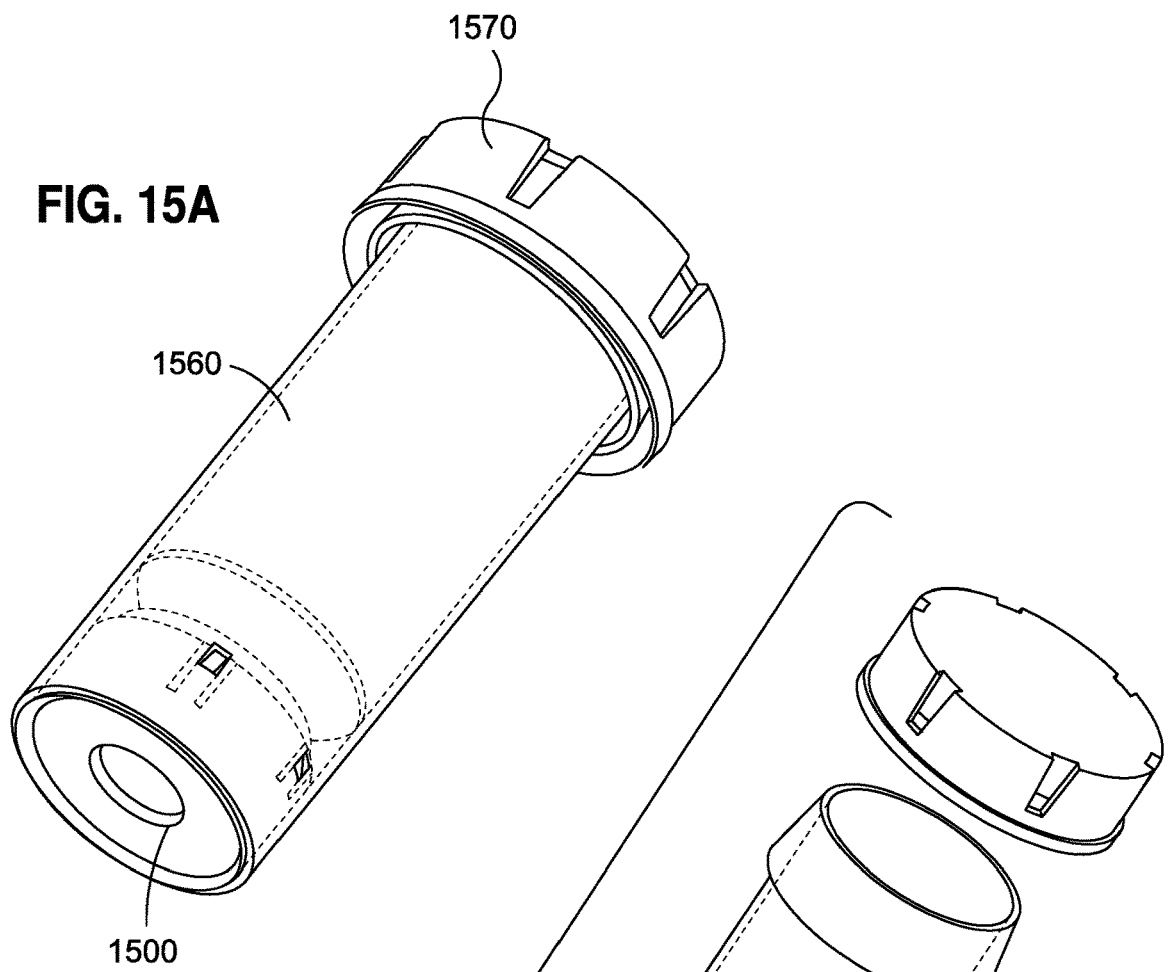
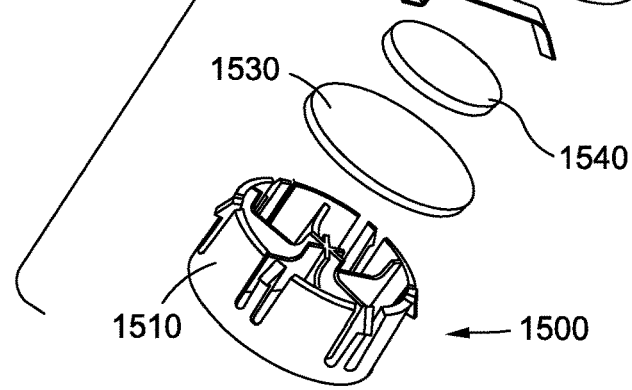
FIG. 15A
FIG. 15B

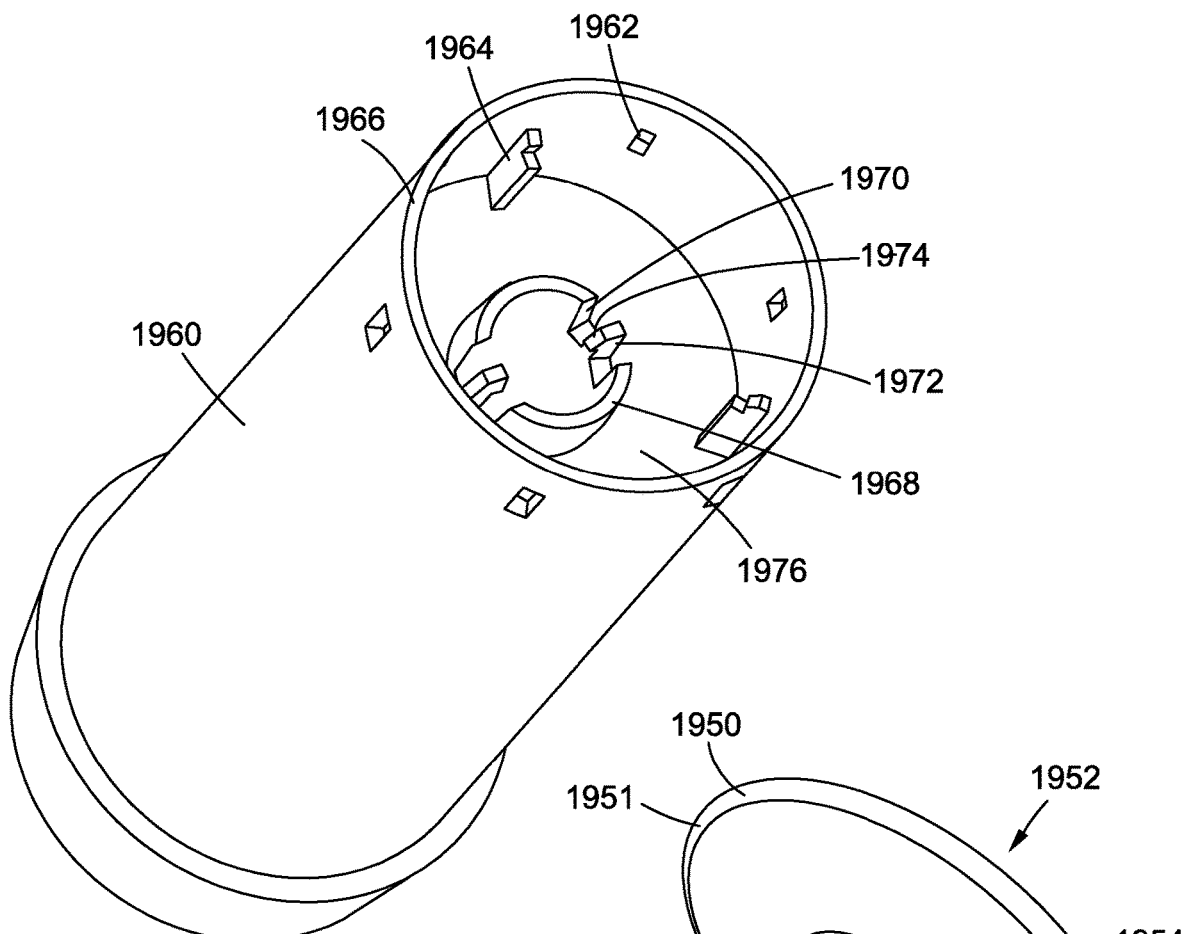
FIG. 20
FIG. 21
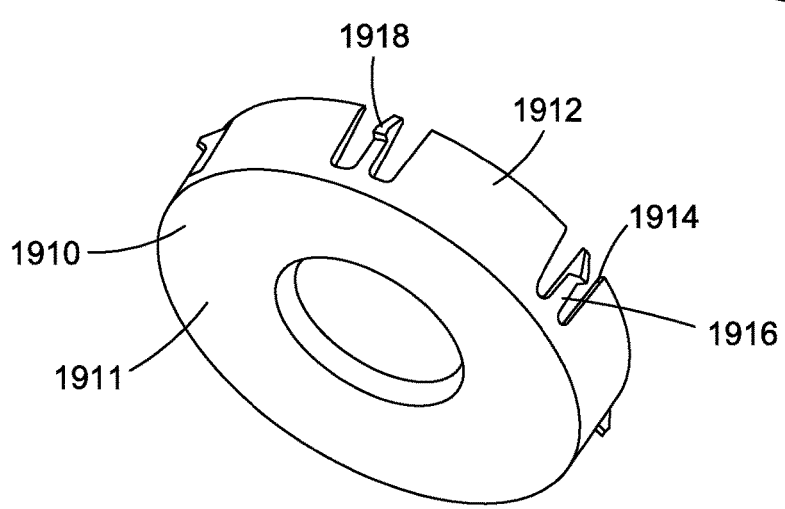
FIG. 22

CONTAINER WITH CONTENT MONITORING AND REPORTING CAPABILITIES

CROSS-REFERENCE TO RELATED APPLICATIONS

This application is a continuation of U.S. application Ser. No. 15/198,582, filed Jun. 30, 2016, now U.S. Pat. No. 10,026,295, which is a continuation-in-part of, and claims the benefit of, U.S. patent application Ser. No. 15/057,289, filed Mar. 1, 2016, which application is a continuation of U.S. patent application Ser. No. 14/610,641, filed Jan. 30, 2015, now U.S. Pat. No. 9,361,772, which application is a continuation of U.S. patent application Ser. No. 13/933,101, filed Jul. 1, 2013, now U.S. Pat. No. 8,976,036, which application is a continuation of U.S. patent application Ser. No. 13/593,514, filed Aug. 24, 2012, now U.S. Pat. No. 8,502,692, which application is a continuation of U.S. patent application Ser. No. 14/503,065, filed Jul. 14, 2009, now U.S. Pat. No. 8,279,076. The above-referenced applications are incorporated herein by reference.

BACKGROUND

One of the cruelest jokes we have ever played on ourselves is the naming of the memory medicine Ginkgo Biloba. Not a smart marketing strategy either. Nonetheless, the product tends to sell and a reason for the sales may simply be that most of us are plagued and frustrated by memory failures. These symptoms manifest itself in trying to remember a person's name, an item that our spouse asked us to pick up at the grocery store, or even simply the reason that we got up off of the couch, walked all the way into another room in the house and then stood there wondering why. Most of these situations can be comically laughed off; however, there are situations where memory failures can be quite problematic or even catastrophic.

A perfect example of a situation in which the adverse effect of memory lapses can be realized is in the taking or administering of medication. Depending on the medication and the individual, failure to take medication can result in severe harm. In view of this, one can appreciate that it can be very important to remember to take or administer medication, and to do so in a timely manner. Thus, what is needed in the art is a mechanism that can remind or notify an individual that he or she must take or administer medication, and even when the medication must be taken or administered.

Another example of a situation in which the adverse effect of memory lapses can be realized is in remembering that you have already received or administered a medication. Such memory lapses can result in an overdose of a medication. In view of this, one can appreciate that it would be advantageous to have a device that keeps track of taken and/or administered dosages, notifies or alerts an individual attempting to take or administer an overdose and/or takes measures to help prevent overdosing.

Most medications that are prescribed to individuals, as well as animals, are provided in containers, such as pill bottles, bottles of serum, or pill pouches etc. The packaging for medication can conveniently operate as a dosage reminder/control gateway in that the person taking or administering the medication at a minimum, must approach the packaging to obtain the dosage. In view of this characteristic, there is a need in the art for a dosage reminder or overdose preventer mechanism that can be attached to, adhered to or otherwise be associated with the packaging.

Related to these needs in the art there are additional needs in the art with respect to determining if a container in general has been opened, moved, tampered with, etc., as well as providing historical data about such activity with the container and providing alerts regarding such activity. These needs in the art can arise in a variety of settings, and a few examples include detecting movement or opening of a liquor bottle, detecting opening of a liquor of gun cabinet, detect movement of a moisture testing apparatus, etc.

Therefore, there is a need in the art for a device that can be used to detect when a container, such as a medicine package or otherwise, has been moved, opened or otherwise tampered with, collecting and storing information about such activity, and reporting to or alerting a person or system of such activity.

SUMMARY

In a broad sense, the disclosure presents an activity monitor that can be attached, affixed or integrated into a variety of devices, such as to the existing packaging of consumer goods that otherwise would not have such capability, and provide monitoring, alerting and/or reporting activity associated with the device. In one embodiment, the activity monitor operates as a medicine reminder. This embodiment includes a schedule which can be pre-programmed at the factory, the doctor's office or the pharmacist, can be programmed by the user, can be programmed remotely (such as via an interface to a user device or a monitoring system) or simply be programmed automatically by learning the behavior of the user. The activity monitor is affixed to the medicine bottle and activity associated with the bottle, such as movement, opening, volume changes, etc. are monitored in view of the schedule. If the schedule indicates that a dose of medicine should be taken at a particular time, but the monitored activity does not determine that the medicine has been taken, an alert signal will be issued to alert the user that it is time to take the medicine. In addition, if the monitored activity indicates that the medicine bottle has been opened prior to a scheduled time, then a tamper alert can be triggered.

In another embodiment, the activity monitor operates only as a tamper detector. In this embodiment, the activity monitor is attached to a device or container and then started. Any movement or activity associated with the device or container is analyzed and/or recorded and may result in triggering a tamper alarm. In some embodiments, the tamper detector may define windows of time during which activity is permitted to occur and during which activity is not permitted to occur. Activity occurring during a permitted window will not trigger a tamper alarm.

These and many other embodiments, as well as various features, aspects and functions of the various embodiments are more fully presented below.

BRIEF DESCRIPTION OF THE DRAWINGS

FIG. 15A and FIG. 15B show a scale-type activity monitor embedded within a container to measure the mass of the container and any contents therein, according to one exemplary embodiment.

FIG. 20 shows an exemplary bottle configured to receive the scale-type monitor shown in FIGS. 19A and 19B.

FIG. 21 shows an exemplary loading platform of the scale shown in FIGS. 19A and 19B.

FIG. 22 shows an exemplary housing of the scale shown in FIGS. 19A and 19B.

DETAILED DESCRIPTION OF EMBODIMENTS

The present disclosure, as well as features and aspects thereof, is directed towards an activity monitoring or detection device, apparatus, system and/or method that monitors or detects activity associated with a container. The activity monitoring device or system has particular utility to a medicant container, although it will be appreciated that the activity monitor presented in this disclosure may be used in a variety of settings and environments, and may be used for a variety of purposes. Specific examples are illustrated and described within the disclosure to provide a general, overall and specific understanding of the various aspects, functions, operations and capabilities of the activity monitor but, such specific examples are provided as non-limiting examples.

One specific example in which an embodiment of the activity monitor may be utilized in within the context of a medicine bottle or container. In this example, the activity monitor can operate as a medicine reminder to: (a) signal a user that it is time to take or administer the specific prescription medication, vitamin, over the counter medication, herb etc. (collectively referred to as medicine) that is stored in the bottle, (b) alert or indicate to the user that the medicine has already been taken and that no additional dosages are due at the present time, (c) assist the user in finding the medicine bottle, and/or (d) alert or indicate to the user that someone has moved or opened the bottle at an inappropriate time.

Further elaborating on the activity monitor for a medicine bottle, one embodiment may include a small device that can be attached to the top or cap of the medicine bottle. When the cap on the monitored medicine bottle has not been opened at a scheduled time the activity monitor enters a "reminder alert" state indicating that the content in the medicine bottle has not been take at its scheduled time or within a scheduled window of time. Additionally, the activity monitor can alert the user if the container has been improperly tampered with by someone that the content is not intended for (e.g. teenage kids in the household) and signals this to the user by entering a "tamper alert" state. Further, the activity monitor can provide a higher-level of service by recording and providing or sending the time and the dosage taken of a medication to a central monitoring system. This information, along with other information that can be collected by other health monitoring devices (such as that manufactured by Dexcom) attached to the body can be pertinent information to provide a more real-time evaluation of the performance and impact that a medication is having on a patient, rather than having to make a 2-month follow-up visit.

Turning now to the figures in which several embodiments of the activity monitor are presented and common elements are represented with common labels, the various elements of the embodiments are presented in more detail.

Figure 1A:
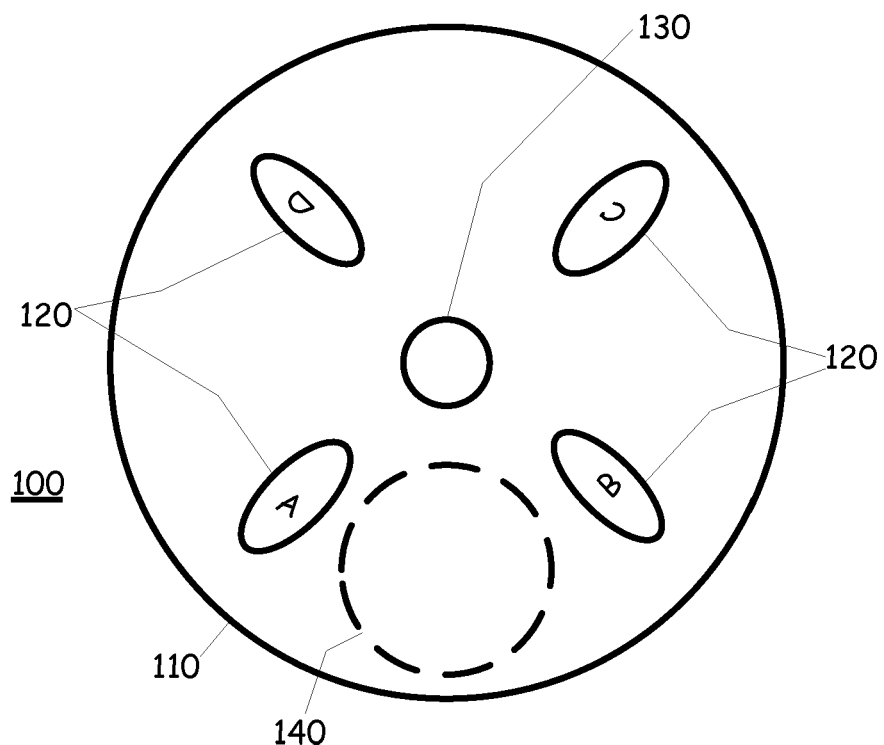
FIG. 1A and FIG. 1B are conceptual depictions of one embodiment of the activity monitor with FIG. 1A illustrating a top view and FIG. 1B illustrating a side view.
Figure 1B:
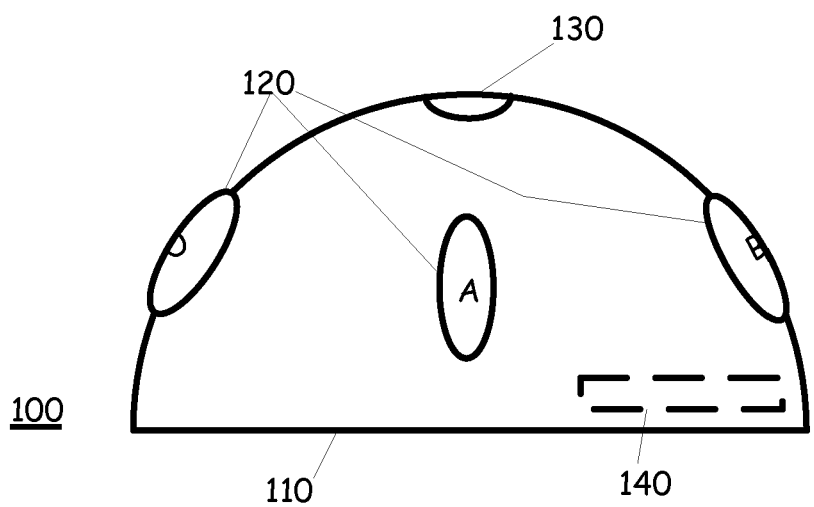

FIG. 1A and FIG. 1B are conceptual depictions of one embodiment of the activity monitor with FIG. 1A illustrating a top view and FIG. 1B illustrating a side view. The activity monitor 100 includes a case 110. Positioned on the top of the case 110 are four buttons 120 (A, B, C and D) and an alert element 130. The activity monitor 100 includes electronic circuitry and/or software, including an accelerometer and a battery power source 140 (shown in dotted lines as they are embedded within the device). The electronic circuitry interfaces to the four buttons or actuators 120, the accelerometer and the alert element 130.

Figure 2:
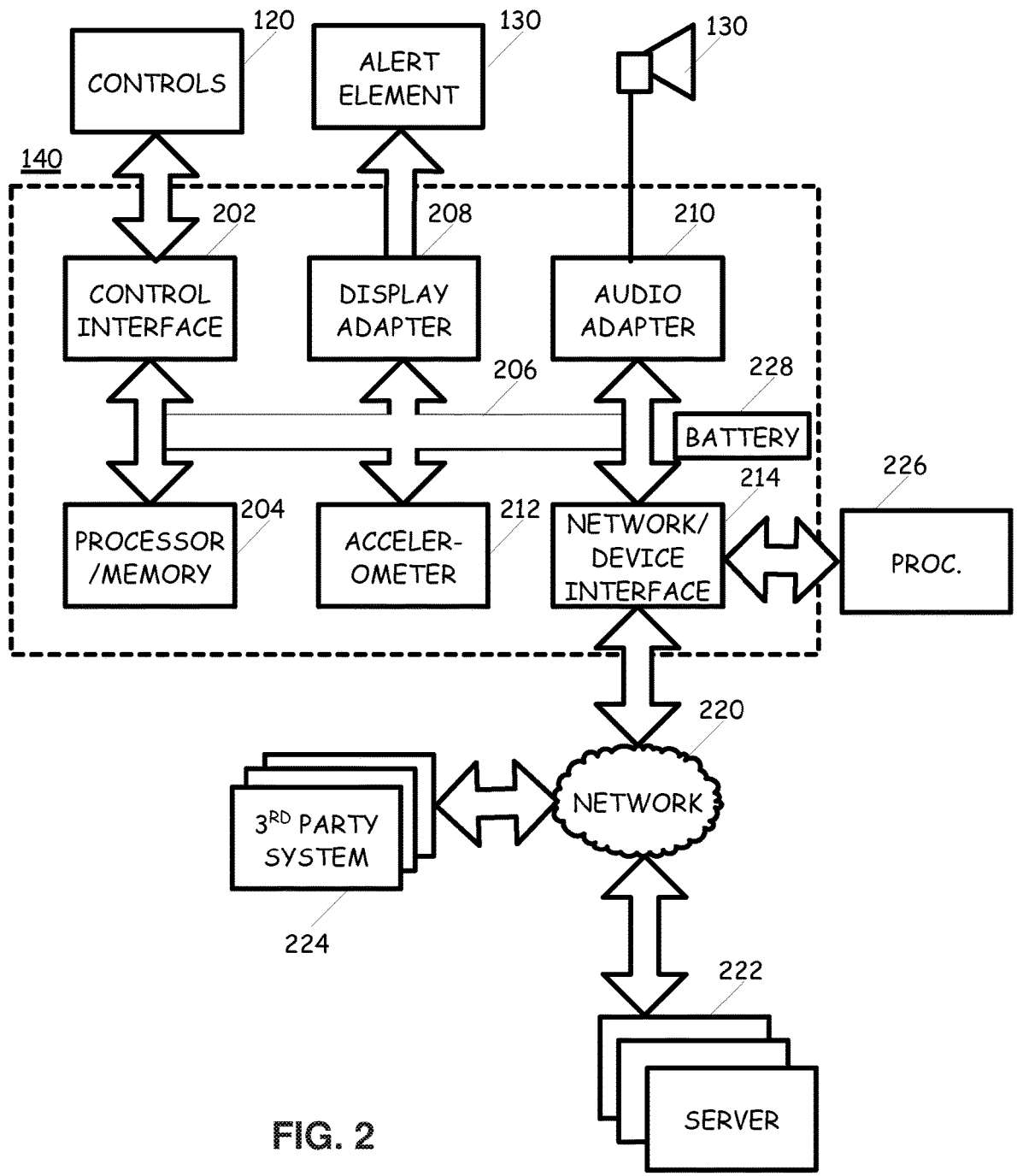
FIG. 2 is a functional block diagram of the components of an exemplary embodiment of the electronic circuitry.

FIG. 2 is a functional block diagram of the components of an exemplary embodiment of the electronic circuitry 140. It will be appreciated that not all of the components illustrated in FIG. 2 are required in all embodiments of the activity monitor but, each of the components are presented and described in conjunction with FIG. 2 to provide a complete and overall understanding of the components. The electronic circuitry can include a general computing platform 140 illustrated as including a processor/memory device 204 that may be integrated with each other or, communicatively connected over a bus or similar interface 206. The processor 204 can be a variety of processor types including microprocessors, micro-controllers, programmable arrays, custom IC's etc. and may also include single or multiple processors with or without accelerators or the like. The memory element of 204 may include a variety of structures, including but not limited to RAM, ROM, magnetic media, optical media, bubble memory, FLASH memory, EPROM, EEPROM, etc. The processor, or other components may also provide components such as a real-time clock, analog to digital convertors, digital to analog convertors, etc. The processor 204 also interfaces to a variety of elements including a control interface 202, a display adapter 208, audio adapter 210, an accelerometer 212 and network/device interface 214. The control interface 202 provides an interface to external controls 120, such as sensor, actuators or the like. The display adapter 208 can be used to drive a variety of alert elements 130, such as display devices including an LED display, LCD display, one or more LEDs or other display devices. The audio adapter 210 interfaces to and drives another alert element 130', such as a speaker or speaker system, buzzer, bell, etc. The network/device interface 214 may interface to a variety of devices (not shown) such as a keyboard, a mouse, a pin pad, and audio activate device, a PS3 or other game controller, as well as a variety of the many other available input and output devices or, another computer or processing device 226. The network/device interface 214 can also be used to interface the computing platform 140 to other devices through a network 220 (LAN/WAN/Internet, etc.). The network may be a local network, a wide area network, wireless network, a global network such as the Internet, or any of a variety of other configurations including hybrids, etc. The network/device interface 214 may be a wired interface or a wireless interface. The computing platform 140 is shown as interfacing to a remote monitoring system or server 222 and to one or more a third party systems 224, such as through the network 220. A battery or power source 228 provides power for the computing platform 140. In other embodiments, as described below, the activity monitor might comprise detection or measuring devices and one or more communication interfaces which communicate the output of those devices (in raw, unprocessed form, or in processed form) to one or more remote devices (such as directed to a user's device, such as a PDA, tablet, computer, smart phone or the like, or to the monitoring system 222).

In some embodiments the activity monitor may interact with other activity monitors or devices through a ZigBee type network architecture. In such an embodiment, the activity monitors can gain intelligence by detecting, receiving and learning other activities or other drugs, medications or substances that were also taken, and at what time (e.g. other vitamins with certain food, this drug with this food, etc.) and then interface with the other devices to provide recommendations, warnings or instructions about any potential overdoses, drug interactions, etc.

Figure 3:
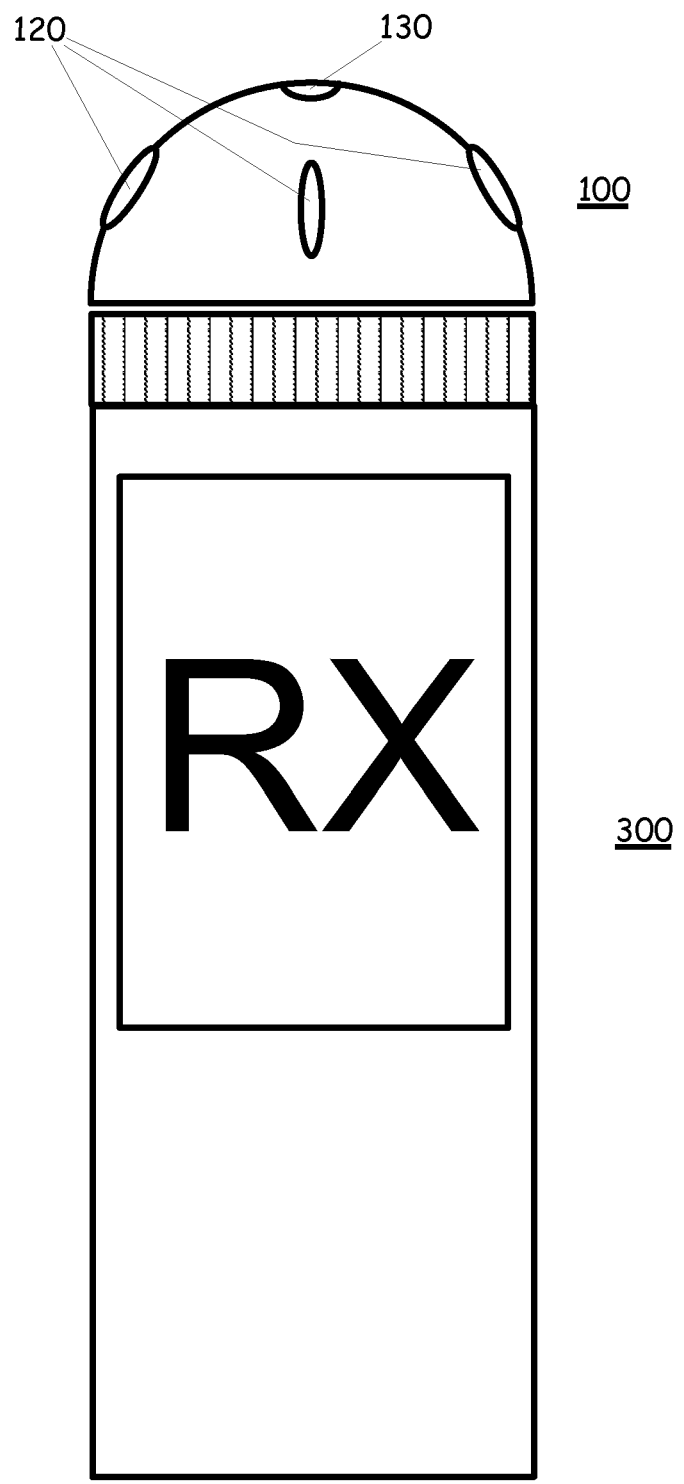
FIG. 3 is a conceptual diagram illustrating one environment suitable for various embodiments of the activity monitor.

FIG. 3 is a conceptual diagram illustrating one environment suitable for various embodiments of the activity monitor. In this embodiment, the activity monitor 100 is shown as being attached or affixed to a medicine bottle 300 containing medicine to be administered. The activity monitor 100 is attached to the top cap of the medicine bottle using any of a variety of techniques, including gluing, adhesive tape, snaps or similar rigid connectors, a screw, tabs, etc. One embodiment of the activity monitor 100 includes a pre-attached adhesive tape component with a protective cover. In this embodiment, to attach the activity monitor 100 to the medicine bottle 300, the adhesive protector is simply removed and the tacky surface is pressed against the medicine bottle top or cap. From this point, the activity monitor 100 is then ready to be programmed or activate to schedule and/or monitor use of the content in the container.

Figure 4:
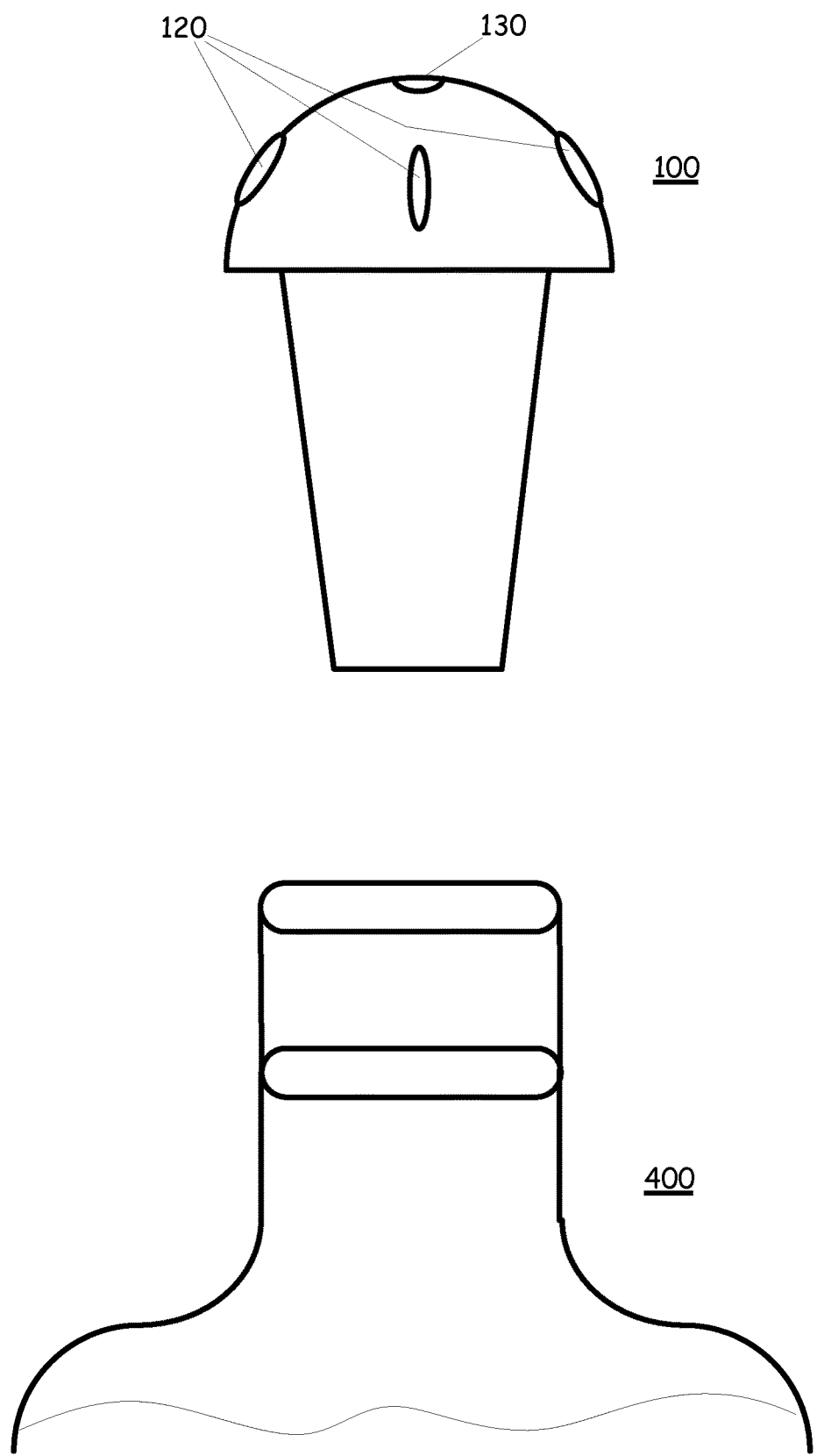
FIG. 4 is a conceptual diagram illustrating another environment suitable for various embodiments of the activity monitor.

FIG. 4 is a conceptual diagram illustrating another environment suitable for various embodiments of the activity monitor. In this embodiment, the activity monitor 100 is shown as being attached, affixed or integrated into a cork or stopper for a bottle, such as a liquor bottle, medicine bottle or any other type bottle 400. In this embodiment, the activity monitor 100 can come with the bottle 400 or sold separately and use after the bottle is initially opened. Once the stopper with the activity monitor 100 is inserted into the bottle, the bottle can then be monitored.

Figure 5:
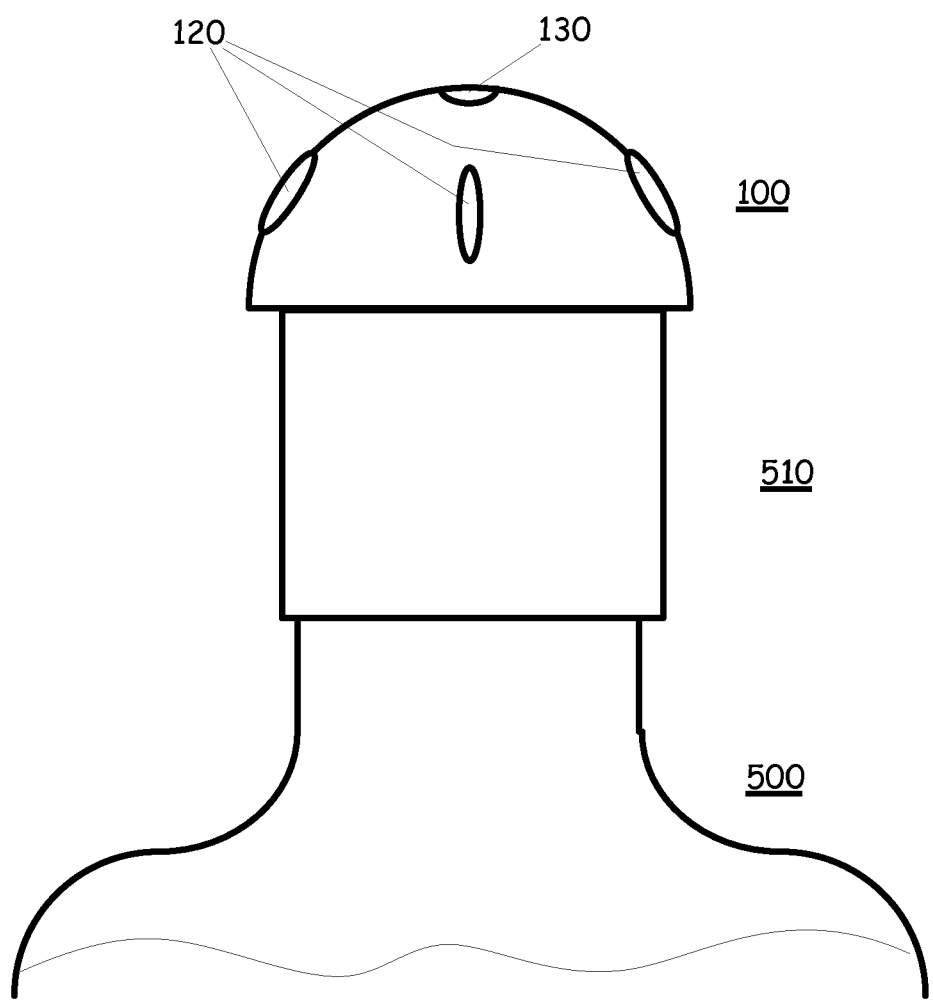
FIG. 5 is a conceptual diagram illustrating another environment suitable for various embodiments of the activity monitor.

FIG. 5 is a conceptual diagram illustrating another environment suitable for various embodiments of the activity monitor. In this embodiment, the activity monitor 100 is shown as being attached, affixed or integrated into a screw-on bottle cap 510, such as a liquor bottle, medicine bottle or any other type bottle 500. In this embodiment, the activity monitor 100 can come with the bottle 500 or sold separately and use after the bottle is initially opened. Once the stopper with the activity monitor 100 is attached to the cap and the cap is placed onto the bottle, the bottle can then be monitored.

Figure 6:
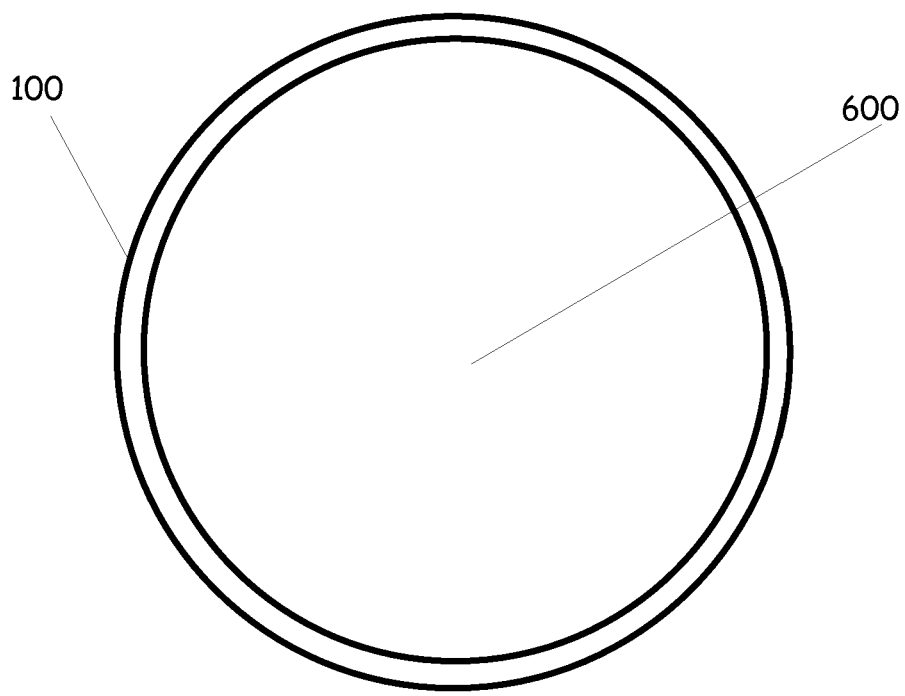
FIG. 6 is a conceptual diagram illustrating an activity monitor with an adhesive connector.

FIG. 6 is a conceptual diagram illustrating an activity monitor with an adhesive connector. In this embodiment, underside of the activity monitor 100 includes an adhesive tape, such as a double-sided tape 600 that is attached to the underside of the activity monitor 100. The opposing side of the adhesive tape is typically covered by a plastic coating or shield to prevent the adhesive from inadvertently being attached to a surface or gathering debris. Various other attachment mechanisms may also be used including Velcro or any loop and hook technique as well as similar structures. When the activity monitor 100 is being put to use, the plastic cover can be removed and the activity monitor 100 can be attached to the surface of the container or object to be monitored.

Figure 7:
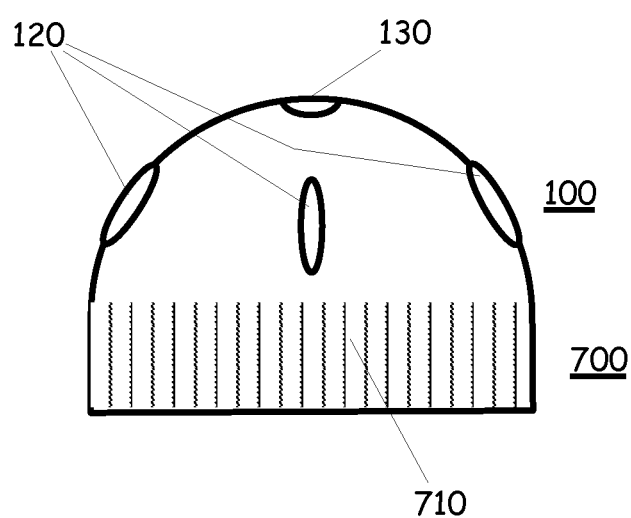
FIG. 7 is a conceptual diagram illustrating an activity monitor built into a cap structure.

FIG. 7 is a conceptual diagram illustrating an activity monitor built into a cap structure. In this embodiment, the activity monitor 100 is integrated into a cap 700 that can be attached to various bottles compatible with the given cap size. As is typical for a bottle cap, ridges 710 may be included on the surface of the cap to facilitate removal and placement.

Figure 8:
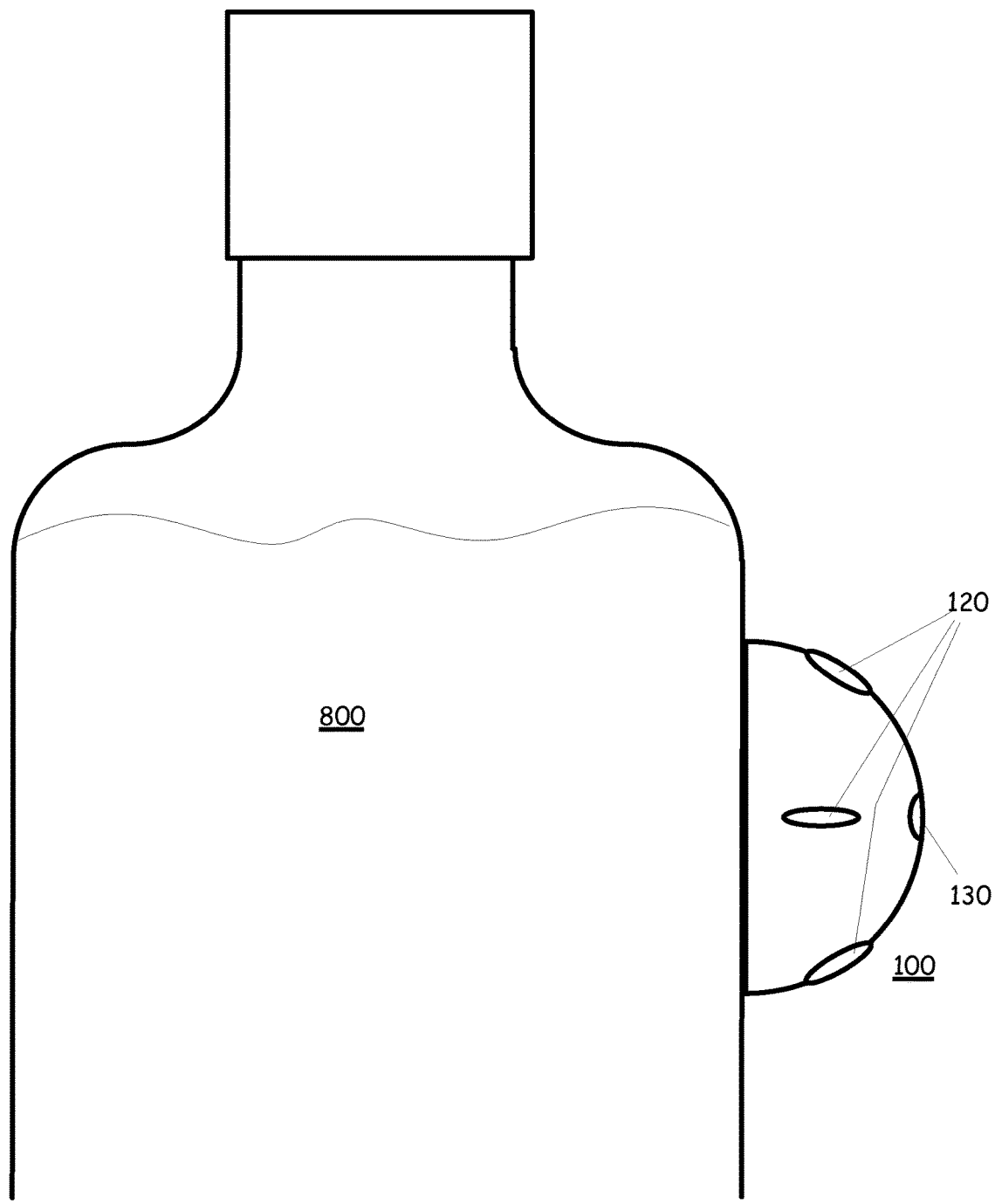
FIG. 8 is a conceptual diagram illustrating an alternate location of attaching the activity monitor to a bottle.

FIG. 8 is a conceptual diagram illustrating an alternate location of attaching the activity monitor to a bottle.

Thus, it will be appreciated that the activity monitor may come in a wide variety of shapes, sizes, forms, configurations etc., and the above-presented embodiments have been provided as non-limiting examples.

Operation of the Activity Monitor

The operation of the activity monitor will be described in three functional stages to facilitate a better understanding. However, it should be appreciated that the functional stages can be mutually exclusive of each other or, in some embodiments two or more stages may coexist on a single activity monitor.

The three stages include: (1) programming; (2) operational; and (3) reporting.

Programming Stage

The programming stage involves the setting up of the activity monitor to perform a desired function. The activity monitor can be provided as a pre-programmed device with fixed, non-changeable settings or, the activity monitor can include a user interface for changing, modifying and programming the operation of the activity monitor. In the former embodiment, the programming stage of the activity monitor occurs during factory construction or, may simply be a default due to memory and/or hardware configurations of the activity monitor. In the latter embodiment, the activity monitor includes a user interface that allows the user to program, modify or configure the operation of the activity monitor.

The programming of the activity monitor configures the activity monitor for a specific application or use. In one embodiment, the activity monitor is set at factory fabrication to include one or more operational configurations. Thus, the activity monitor can be fabricated for different and specific applications. In other embodiments, general purpose activity monitors that include several pre-programmed features can be configured at fabrication. In yet other embodiments, the activity monitor may include configurable features and operations that can be selected and/or adjusted after fabrication, either at the factory or by a distributor, seller, OEM, or user of the activity monitor.

For programmable embodiments, the activity monitor will include an interface for either programming the activity monitor, selecting features of the activity monitor, or setting parameters to adjust the operation of one or more features of the activity monitor. The programming interface may range from a rudimentary interface of a few buttons with audible or LED light feedback confirmation to an elaborate, PC based application program that configures and programs the activity monitor through a port, such as a wireless port (e.g. 802.11, Bluetooth, ZigBee, etc.) or a wired port (e.g. USB, FIREWIRE, etc.). Furthermore, such an application may allow various software downloads into the activity monitor, including software upgrades, selection and activation of desired features, parameter settings, etc. Furthermore, programming can occur from the system level based on information that was obtained based on the customers use pattern. Doctors, pharmaceuticals, children. Grandparents, etc. who are authorized to make schedule changes can program the device from the system.

Operational Stage

Once the activity monitor is programmed, it is ready to enter operational stage. However, the activity monitor may remain dormant for an extended period of time before it placed into the operational stage. Also, the reader should understand that even if the operational stage is entered, the programming stage can be reentered at any time for embodiments that allow reprogramming of the activity monitor. The operational stage may be entered or triggered in a variety of fashions. A few non-limiting examples including pushing an "on" button, removing a plastic cover over the battery to allow continuity, removing a cover from a photovoltaic sensor, etc. During the operational stage, the activity monitor monitors various sensors and makes operational decisions based on such monitoring. For instance, the activity monitor may monitor one or more accelerometers, a photovoltaic sensor, biometric sensor, a pressure switch, a magnetic switch, an electromagnetic switch, RFID detectors, user interface buttons etc. During the operational stage, the activity monitor may also record data into its internal memory or, transmit date to an external device over a wired or wireless interface.

Reporting Stage

Upon completion of the operational stage or, at some point after the operational stage is entered, it may be desired to extract data from the activity monitor. This is referred to as the reporting stage. The types of data, frequency of reports, etc. can vary greatly depending on the particular use of the activity monitor. In any case, in the reporting stage the data that is stored internal to the activity monitor or, that has been previously extracted is reviewed and any necessary reports that reflect information about the data can be generated.

Examples of Embodiments

Although the reader will appreciate that a wide variety of uses could be employed for the activity monitor, a few non-limiting examples are provided to illustrate the various capabilities, aspects and functions of various embodiments of the activity monitor.

Medicine Reminder

One feature that may be incorporated into an embodiment of the activity monitor includes the medicine reminder feature. This feature operates to alert a person or a person caring for a person, patient, animal, etc., that it is time to administer a dosage of the medication contained within a bottle. Thus, the activity monitor is attached to the bottle of interest. The activity monitor is programmed to provide an alert at the specific dosage times. For instance, if the medicine is to be taken in 4 dosages throughout a 24-hour period, the activity monitor can be programmed to provide the alert every 6 hours. In some embodiments, the exact hours are fixed (such as 6 am, 12 pm, 6 pm and 12 am) but, in other embodiments the exact hours can be adjusted through the user interface, at the factory or based on the specific times that the activity monitor is used in the learn mode (e.g., 8 am, 12 pm, 5 pm and 11 pm—because this works best with the user's schedule) configuration. When the activity monitor provides the alert, the activity monitor then begins to monitor the bottle activity. If the activity monitor does not detect that the bottle has been tended to, such as the accelerometer detecting that the bottle has been moved or opened, or other sensors in the activity monitor detect activity that indicates the same, then the activity monitor may be programmed to provide an escalating alert notification (e.g., an increasingly louder alarm). If the activity monitor detects that the bottle has been moved or opened, or that medicine has been removed from the container, then the alarm can automatically be reset. In other embodiments, the activity monitor may include a reset button to silence the alert condition and begin the next cycle.

Medicine Alarm

Another feature that may be incorporated into an embodiment of the activity monitor includes the medicine alarm. The feature operates to help prevent over dosages of a medication. For instance, if this feature is combined with the medicine reminder feature, once the activity monitor detects that the medication has been taken, a lock-out timer can be initiated. If the activity monitor detects that the bottle or container has been moved or opened during the lock-out period, an alert can be triggered to notify the user that no dosages are presently due to be administered or taken.

Tamper Detector

Another feature that may be incorporated into an embodiment of the activity monitor includes a tamper detector. As a tamper detector, the activity monitor can be affixed or attached to a variety of items or containers. If the activity monitor detects that the device or container has been moved, opened, jarred, etc., it can record such information as a data entry and/or provide an alert indicator. The tamper detector may also include windows of time at which activity would be considered to be a tamper, and windows of time during which activity is permissible. For instance, liquor bottles in a bar would include a window of permissible activity during working hours but, if the bottle is moved while the bar is closed, this would be considered as a tamper. The tamper detector may be configured such that the entrance of a specific key sequence or authorization code can be used to silence the alarm or exit the alarm state. If the code is not entered properly, the alarm condition continues. Further, rather than simply sounding an alarm, the tamper detector may also include an interface to provide external notification (i.e., POTS, Cellular, Internet, etc.).

Closed-Loop Medication Monitor

It will be appreciated that the interaction of medication with an individual can vary depending on a wide variety of circumstances and elements. Such circumstances and elements can include the body weight of the individual, the individual's metabolism, the dietary habits of the individual, the saturation of the medication in the individual, the absorption rate of the medication, etc. For instance, the activity monitor can be integrated into or with other monitors, sensors and devices to provide an overall control mechanism for the administration of medication. As an example, the activity monitor operating as a medicine reminder may be programmed to administer certain dosages of medication at specific times. However, in response to feedback from other sources, such feedback being associated with one or more of the above-identified circumstances and elements, as well as others, the dosage amount and periodicity of the dosage can be modified in real-time. Thus, such an embodiment provides a closed-loop monitoring system that can help to optimize the administration of medications.

To further facilitate the understanding of the various aspects, features and applications of the various embodiments of the activity monitor, a few additional non-limiting examples are provided.

Simplified User Interface

In one embodiment, the activity monitor includes simplified user interface for programming of the medicine reminder function. In the embodiment illustrated in FIGS. 1A and 1B, the activity monitor includes 4 buttons. However, it will be appreciated that the activity monitor can include more or fewer buttons and the 4-button configuration is provided as a non-limiting example only. In the illustrated embodiment, the medicine reminder operation can be set by a user pressing one of the four buttons and holding it down for a given period of time (i.e., 10 seconds) to select the mode of operation associated with the button. If the buttons are labeled 1, 2, 3, 4, pressing and holding the button can activate the medicine reminder to sound an alarm for the selected number of dosages, periodically through a 24-hour period beginning at the current time. Thus, if the user presses and holds the 3 button down for the required period of time, the user will be notified to take a dose at the current time (or this may simply be assumed) and then, notified again every 8 hours that another dosage is due.

In other embodiments, the activity monitor may include intelligence that monitors the activity of the user and adjusts the schedule accordingly. For instance, if the user takes a certain medication regularly, if the activity monitor detects that the user is always 1 hour late for a particular dose, then the activity monitor may adjust the dosage time to more align with the user's schedule. Further, the user may be allowed to program the activity monitor to provide alert notifications at specific times. Thus, the user can have a schedule that is not exactly aligned on a periodic basis but is within prescribed parameters for the particular medication. Further, the schedule may be adjusted due to other factors or data received from other sources. For instance, environmental issues (i.e., atmosphere, temperature, stress levels, sleep quantity/quality, etc.) may be used to retard or accelerate the dosage due notice. For instance, in the case of a migraine patient, a sudden change in barometric pressure may trigger an earlier notification to take a drug such as Topamax or a Triptan.

Programmable User Interface

Figure 9:
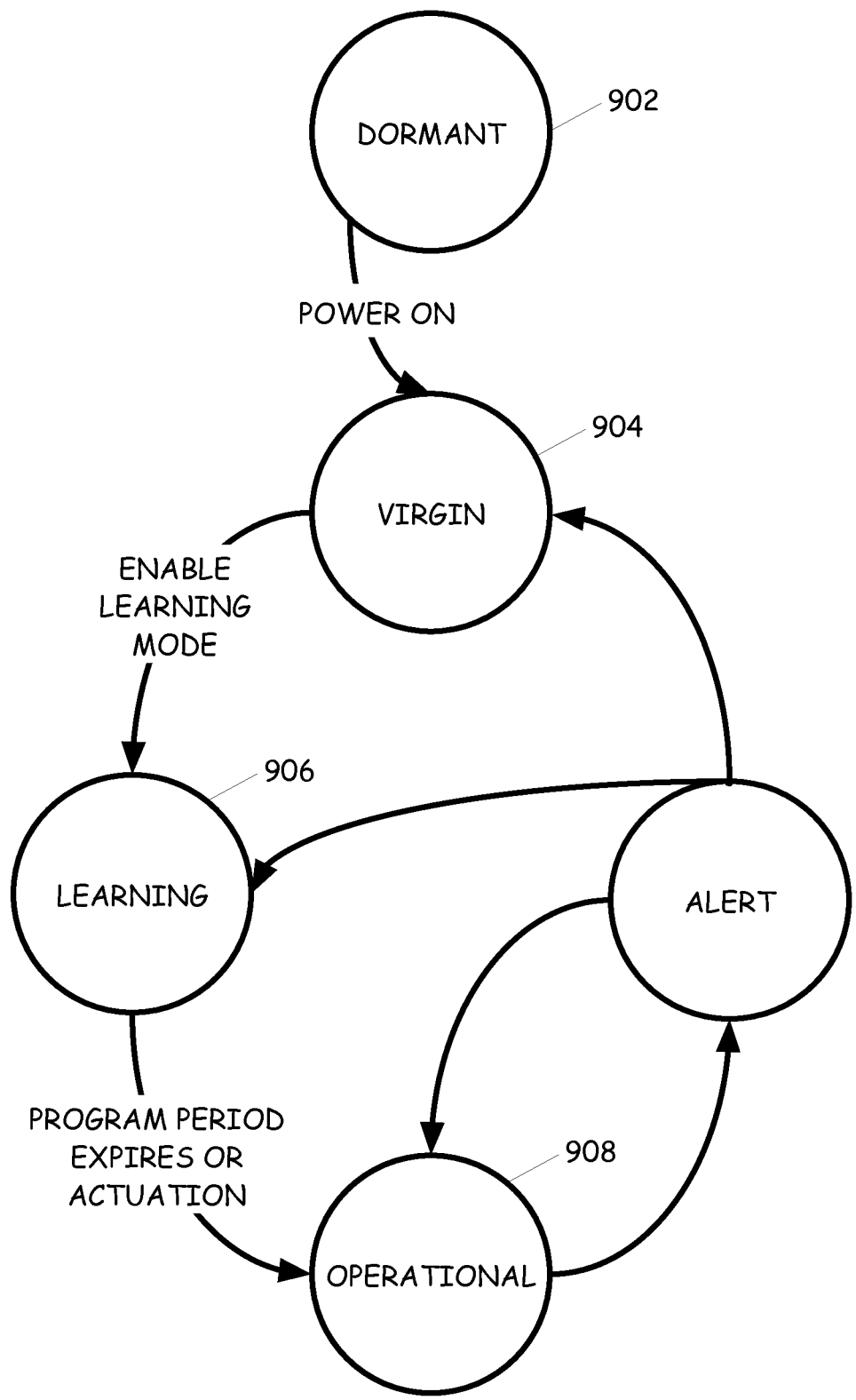
FIG. 9 is a state diagram illustrating the operation of a programmable user interface in an exemplary embodiment of the activity monitor.

FIG. 9 is a state diagram illustrating the operation of a programmable user interface in an exemplary embodiment of the activity monitor. In this embodiment, the activity monitor 100 can be programmed for multiple alerting times (such as four schedules) within a given period of time, typically a 24-hour period. It should be appreciated that although the present example is described as including up to four alert times within a 24-hour period, that any number of alert times over any period of time could also be utilized. For instance, the alerts could be based on a time period of a week, 12 hours, or any other time period including varying times between dosages.

In the embodiment being described, a new activity monitor is first resident in the dormant state 902. In the dormant state, the activity monitor does not have any power being applied to the circuitry. To exit the dormant state 902, power is applied to the activity monitor. Applying power can be accomplished in a variety of techniques including, but not limited to, moving a switch, installing a battery, removing a battery isolator plastic strip, or the like. Once power is applied to the activity monitor, the activity monitor transitions to the virgin mode 904.

In the virgin mode 904, the activity monitor has power applied to it but, it has not received any programming information or, has not received the necessary programming details for operation.

The embodiment being described includes a learning mode 906 to facilitate self-programming or assisted programming of the activity monitor. Once the activity monitor is attached to a cap or container, the initial programming is performed by first placing the activity monitor into a "learning mode". In an illustrative embodiment, to enter the learning mode, an actuation by a user is performed. For example, a user may press and hold a particular button, such as the top or center button 130 for a period of time, such as 10 seconds, to cause a transition to the learning mode 906. However, it will also be appreciated that the activity monitor may automatically transition from the virgin mode 904 to the learning mode 906 after being powered up or after a particular period of time. In addition, some embodiments may transition from the dormant mode 902 directly to the learning mode 906.

Figure 10:
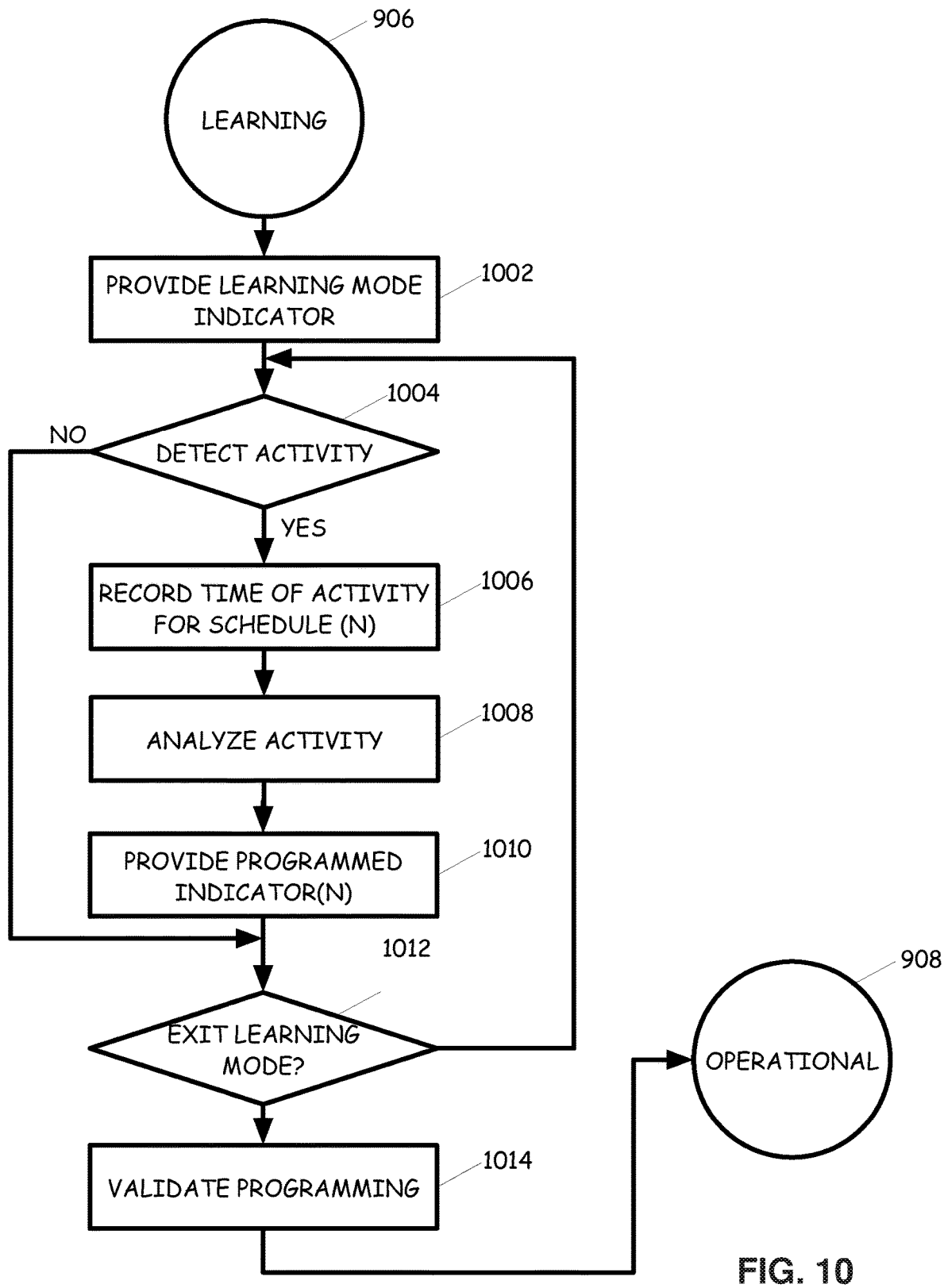
FIG. 10 is a flow diagram illustrating exemplary steps in an embodiment of the learning mode.

FIG. 10 is a flow diagram illustrating exemplary steps in an embodiment of the learning mode. Once the learning mode 906 has been entered, an indicator can be provided as feedback to the user 1002. For instance, to indicate that the activity monitor is in the learning mode 906, the four external LED's 120 can blink, alternating between red and green. When the activity monitor 100 enters the learning mode 906, it resides in this mode for a programming period of time, such as 24-hours. During the programming period, the activity monitor monitors the use of, and memorizes/records the use of the container associated with the activity monitor.

In a typical learning mode 906, a loop can be entered to program one or more schedules based on activity associated with the container. Initially the activity monitor looks for the detection of activity 1004. The first time that the container is opened, accessed or moved within the programming period while learning mode is active, the activity monitor records the time of the activity and associates the time with the program for schedule 1. For instance, in a particular embodiment, if activity is detected 1004, then the time of the activity is recorded for one of the available schedules (such as the next incremental schedule(n)) 1006. Prior to accepting the activity as a valid programming, the activity monitor may conduct an analysis of the activity 1008. The analysis applies heuristics or rules to verify that the activity detected actually constitutes a programming request. The heuristics may include a variety of rules or criteria. A few non-limiting examples include:

(a) is the activity too proximate to other recent activity (b) did the activity meet a threshold activity level, was it too short to constitute an opening, was it too long, etc.

(c) is the current time an increment of previously stored schedule times?

(d) automatically suggesting activating specific times of use based on the med type, information received from the doctor and systems and info from the sleeping patterns, etc.

Once the activity monitor accepts the activity as a programming action, the program schedule is update and an indicator that schedule(n) has been programmed can be provided through indicator(n) 1010. Thus, the time of the activity may be stored in a memory location associated with a first schedule, with each of the LED's on the activity monitor being associated with a schedule as well. After programming the first schedule, the first LED is changed to represent that the programming for that schedule has been accepted and is complete. For instance, the LED may change from alternating between red and green to being a solid green, or simply flashing green. The remaining LED's on the activity monitor continue blinking to show that learning mode is still active.

The activity monitor then determines if the learning mode should be exited 1012 and if not, processing continues at step 1004. At this point, it should be appreciated that if the activity monitor is being programmed for a medication that is only taken once a day, then there are no further steps necessary and the learning mode can be exited. At the end of the programming period, the learning mode will be exited with only one schedule being programmed. However, the user should be careful not to take the medication the following day any sooner than a trigger threshold from the first administration to ensure that the activity monitor is not confused as to whether this is a second dosage in the cycle or the beginning of a next cycle. In some embodiments, the activity monitor may query the user to resolve such a conflict.

In addition, some embodiments may also include an actuation mechanism to exit learning mode. For instance, the same actuation used to enter the learning mode, or some other actuation, may be used to exit the learning mode. As a specific example, when the learning mode is active, the user may exit the learning mode by either allowing the programming period to expire or, by manually exiting the learning mode (i.e., pressing and holding one of the buttons 120 for 10 seconds as a non-limiting example).

For medications or items that are taken multiple times per day or per programming period, the user simply takes such content at the necessary times as prescribed/desired during the initial programming period while in the learning mode is active. The activity monitor detects activity associated with the container and, if it concludes that a dosage has been taken, the activity monitor records the additional scheduled times of use in the other scheduled time periods. For any schedule period that is not scheduled after the initial programming period learning mode (e.g. schedule #3 and schedule #4 in an example where the user takes dosages only twice daily) the LED's will be clear indicating that there is no activity associated with those schedules.

Thus, the learning mode can be exited 1012 in a variety of manners including, but not limited to, the programming period expiring, the user actuating an exit button or the conclusion of programming each of the available schedules.

Prior to exiting the learning mode, the activity monitor may perform a validation step 1041 to ensure that the programming information is correct or is logical. The activity monitor can look at the above-identified heuristics as well as other heuristics to determine if the program entries appear to be a valid program. For instance, if three schedules are entered in 6 hour increments and a fourth schedule is programmed two hours from the third schedule, the activity monitor may trigger a programming alert to the user. Depending on the embodiments of the invention, the programming alert may simply flash indicating that the programming is invalid and needs to be reprogrammed or, a more elaborate user interface may be employed to indicate what the questionable programming entries are and allow the user to remedy or override.

Figure 11:
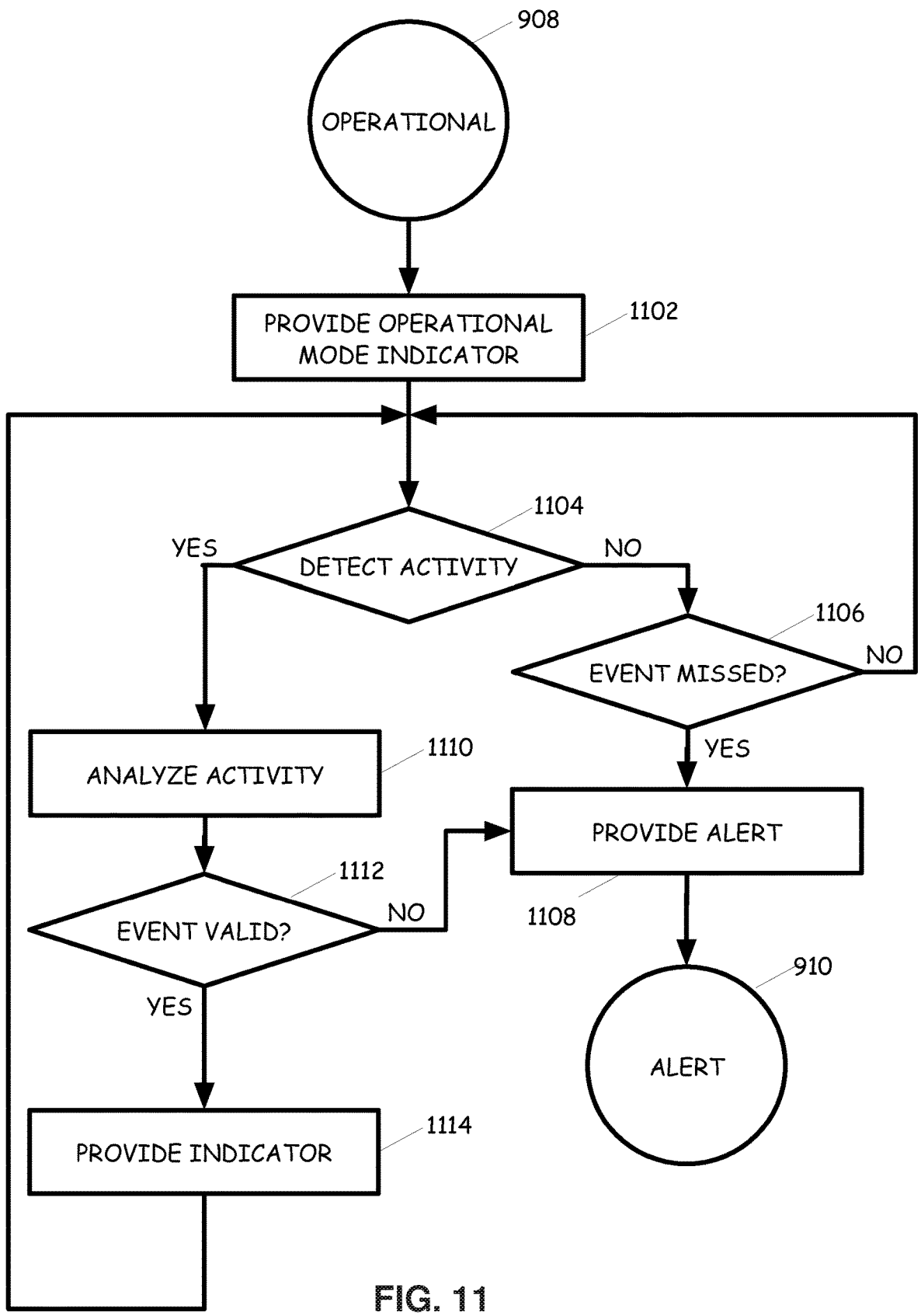
FIG. 11 is a flow diagram illustrating typical steps in an exemplary operational mode.

After the initial programming period, the activity monitor exits the learning mode 906 and enters operational mode or monitoring mode 908. In the operational mode 908, the activity monitor monitors the activity associated with the container in view of the program schedules. By applying a set of heuristics or rules, the activity monitor makes a determination as to whether or not compliance with the programmed schedules appears to have occurred or if action needs to be taken. FIG. 11 is a flow diagram illustrating typical steps in an exemplary operational mode.

Initially, the activity monitor 100 may provide an indicator that the activity monitor is in operational mode 1102. The operational mode 908 indicator can be presented in a variety of manners, such as a constantly illuminated LED, a flashing sequence of LED's or the any of a variety of other techniques. Similar to the learning mode 906, the operational mode 908 then looks for the detection of activity associated with the container but, the operational monitor loop also looks at the program schedules. In the illustrated embodiment, the activity monitor 100 seeks to detect activity associated with the container 1104. If activity is not detected the program scheduling is examined to determine if an event has been missed 1106. If an event has been missed, an alert indicator is provided 1108 and the alert mode 910 is entered. As a specific example, if a user fails to remove the cap of a container within a threshold period of time after a scheduled time (i.e., 15 minutes as a non-limiting example), the activity monitor provides an alert indicator and then enters an alert mode 910. In addition, the LED in the schedule period in which the cap has not been opened will blink RED further indicating that the content has not been taken.

If activity is detected 1104, then the activity is analyzed in view of the afore-mentioned heuristics and rules, as well as others, in view of the program schedules 1110. If the activity is valid and is associated with a valid, scheduled event, then an indicator may be provided that the programmed event has been satisfied 1114 and processing continues at step 1104 to monitor additional activity. However, if the detected activity is not valid or associated with a valid event, then the activity monitor may trigger a tamper alert and provide an alert indicator 1108 as it transitions into the alert mode 910. As an example, one embodiment of the activity monitor may by default, monitor the use of the cap during the scheduled times and transition to an alert mode if the cap is removed more than 30 minutes prior to a scheduled period. In one embodiment, the activity monitor, when entering tamper alert mode, may chirp rapidly and loud and flash the LED, indicating that the cap has been removed outside of the scheduled periods of use. In other embodiments, a silent alarm may be employed so that only the valid user knows that the container has been tampered. In yet other embodiments, a signal may be sent to another device, such as a cellular telephone or pager through any of a variety of transmission techniques, to sound an alarm or provide a tamper alert indicator. It will be appreciated that a wide variety of alerts can be provided in the various embodiments. A few non-limiting examples include pre-recorded phrases, sound clips, ring tones, buzzers, tones, vibrations, pings, or the like.

As previously described, the alert mode may be entered due to a missed scheduled event or due to a tamper event. Other alert modes may also be defined and employed in other embodiments of the activity monitor. In the described embodiment, the alert mode can be reset or exited if the alert was caused by a missed event. However, if the alert was caused by a tamper, the activity monitor cannot be reset or, can only be reset by entering a pass code.

To exit the alert mode, the user must actuate the device. In one embodiment, the alert mode 910 may be exited simply by opening the container and taking the medicine dosage. In other embodiments, one or more buttons can be pressed and held for a period of time to cause a transition out of the alert mode 910. Various exit means may also be used if it is desired to have the activity monitor exit to a desired state. For instance, the activity monitor may exit to the virgin state 904 in response to one actuation, the learning mode 906 in response to a second actuation and the operational mode 908 in response to a third actuation.

If the alert mode 910 was entered due to a tamper event, the user may be required to not only actuate the activity monitor, but then in response to a prompt, enter a pass code to allow transition from the alert mode. As an example, for the embodiment presented in FIGS. 1A and 1B, a user may be required to press and hold the center button for 10 seconds to initiate a transfer out of a tamper event triggered alert mode. The activity monitor may then provide an indicator, such as flashing LED's and/or a sound to indicate that the user must provide the pass code. The user may then enter a sequence of buttons 120 that satisfies the required pass code. It should be appreciated that the pass code may be factory set and provided to the user along with the activity monitor or, the pass code can be programmed by the user in virgin mode 904 or the learning mode 906. As another example, to exit a tamper alert mode, the user may be required to remove the cap and place it on the counter for 30 seconds making sure it's stationary for at least 30 seconds. Next the cap can be replaced on the container and then by pressing and holding one of the buttons for a prolonged period of time (i.e., 15 seconds). In another embodiment, an external device may be required to cause the activity monitor 100 to exit the tamper alert mode. For instance, a key may physically be entered into the activity monitor to reset the tamper alarm or, a signal from an external device, such as a cellular telephone, RFID tag, etc. may be used to reset the tamper alert mode.

One embodiment of the activity monitor is a tamper detector. In this embodiment, the activity monitor can be used exclusively to monitor the inappropriate or unauthorized use of any bottle with a cap, such as prescription drugs, alcohol, sodas in the fridge for children on special diets, etc. To program activity monitor to operate exclusively in a tamper alert mode around the clock (i.e. no programmed schedules) the activity monitor is placed into the learning mode. An indicator is then provided to the user, such as the LED's blinking and alternating from red to green indicating it's in the learning mode. While in the learning mode, the activity monitor may then be set to operate as a tamper detector only using a variety of techniques. In other embodiments, the activity monitor may come factory set to only operate as a tamper detector.

As a non-limiting example, for the above-describe embodiment that includes 4 program schedules, a tamper only monitor mode can be invoked by using the following programming sequence:

(1) attach the activity monitor to the container (2) set the container down in a stable and stationary position for a threshold period of time, the time of 30 seconds is used as a non-limiting example throughout this procedure (3) remove the cap and place the cap on the counter for 30 seconds making sure the cap is stationary—after 30 seconds, an LED will turn green (4) place the cap back onto the container and wait 30 additional seconds making sure the cap and container are stationary (5) open the cap again repeating the process 3 more times by opening the cap and replacing the cap as described above. Once programmed in the tamper alert mode, one or more LED's will blink green 5 times and then they will be clear indicating that the tamper detection mode has been successfully programmed to monitor any use of the cap at any time.

At this point, if activity is detected, the activity monitor will enter the tamper alert mode. It will be appreciated that a variety of other techniques can be used such as pressing and holding certain button combinations, or entering certain button sequences.

In a computer interface enabled embodiment of the present invention, the activity monitor can be communicatively coupled to a computer for programming. In such an embodiment, a wireless technique or a wired technique may be utilized. An application program may be presented on the computer to identify the connected activity monitor and provide programming instructions and capabilities for the activity monitor. In addition, the programmed schedules can be read from the activity monitor for evaluation, and the historical activity of the activity monitor may be accessed and analyzed.

Further Applications, Embodiments, and Modifications

In a particular embodiment of the present invention, the activity monitor may be programmed at a pharmacy at the time medication is dispensed to a customer (or might be programmed remotely, such as by using an interface/computer at the pharmacy which communicates with the activity monitor, such as via the monitoring system). Thus, the pharmacist can program the activity monitor in accordance with the doctor's prescription. Similarly, the activity monitor can be programmed at the doctor's office (or remotely) and provided to the patient. For example, the activity monitor can be programmed automatically based on the type of drug and the information received from the doctor (i.e., which may have been sent automatically to the pharmacist,) as well as, or pre-provided or presently provided user preferences.

In some embodiments, the activity monitor may be configured to communicate with an external system used by the pharmacist or the doctor. For example, a pharmacy may utilize an automated pick system that dispenses medications into a container and affix labels to the containers. The activity monitor may communicate with the automated pick system such that the activity monitor is programmed to store the amount of medication dispensed into the bottle and an operational schedule for taking the medication by a patient.

One aspect that can be incorporated into various embodiments of the activity monitor is a "buy-now" or "order-now" feature. This feature provides a button on the activity monitor that can be pressed to trigger or initiate an order for a refill. For example, the activity monitor may be provided with the prescription information stored within its memory. Further, the activity monitor may be wireless tethered to an Internet connected device, such as a BLACKBERRY or IPHONE. When the "buy-now" button is pressed, prescription information may be read out of the activity monitor and then transmitted to the user's pharmacy requesting a refill or to the doctor's office requesting a renewal of the prescription. Similarly, the activity monitor could be utilized with a variety of consumables and operate to provide such notice to a user with regards to a need to purchase additional quantity.

Another aspect that can be incorporated into various embodiments is the feature of sending alert messages to various devices and individuals. For instance, for an elderly person, if an alert condition is detected, a message may be sent to the user's children to notify them to come and check on their parent. The messages can be sent in a variety for forms, such as pages, text messages, twitter postings, Facebook postings, email messages, etc.

As indicated above, in one embodiment, the activity monitor may be configured to communicate with an external device such as a server or the like. The server may then be configured to communication with one or more additional devices, such as user computer, phone, tablet or the like. In another embodiment, the activity monitor may be configured to communicate directly with a user device, such as via a transmitter or transceiver which supports one or more compatible communication protocols with the user device. For example, the activity monitor may send alert messages to indicate that it is time to take a dose of medicine. For instance, the activity monitor may send a text message, email message, or any other variety of messages to a user's device, such as a cellular telephone, PDA, IPHONE, etc. The user is then notified that it is time to take his or her medication.

For example, when the activity monitor determines that it is time to take a dose of medicine, the activity monitor may send a communication via WiFi, Bluetooth, NFC, etc. to a user's mobile device to generate a reminder on the mobile device that it is time for the user to take the dose of medicine. The system may further be configured such that the alert or reminder on the mobile device is configured to remain on the mobile device until one or more of the sensors on the activity monitor determines that the medicine has been taken from the container. In other words, unlike other alerts on the mobile device that may easily be dismissed via action taken on the mobile device, the system may be configured so that the alert on the mobile device is only dismissed based on a signal from the activity monitor that the medicine has been dispensed. For example, the user's mobile device might be configured (such as via an activity application on their phone) to display a red "take medication" screen which is only removed if the monitoring system and/or user device receive an activity report from the activity monitor which indicates that the medication has been taken.

In one embodiment, the user may utilize an application which runs on their device or a web browser, as an interface to the activity monitor. The activity monitor may provide raw data to the user's device which is then processed or utilized by such an application, or the activity monitor might be configured to process data. As one example, the activity monitor might send information regarding a detected mass of the container and/or contents at a first time and information regarding a detected mass of the container and/or contents at a second time. The server or user device might then process the mass readings or data to calculate or determine that a certain quantity of medication was taken. For example, the server or user device might calculate the change in mass and compare that change in mass to a mass of a designated dose of medication to determine that the user removed an amount of medicine from the container which corresponds to the dose of medicine the user was scheduled to take. In another example, the activity monitor might include processing capabilities to utilize detected measurements to generate a processed output. As one example, the activity monitor itself might utilize stored mass data to determine a change in mass and then report that change in mass or a determined medicine dose to a remote device.

In further embodiments, the system or a user device may create a detailed record of the medicine being dispensed by the container with which the activity monitor is associated. For example, each time a person takes a medicine within the dispenser, the system or a user device may track information associated with the event. The information may include, among other things: (1) what is being consumed, such as an identification of the medicine within the container; (2) who is taking the medicine, such as via an identification authorization via a mobile device or the activity monitor through a password, fingerprint sensor, or other identification method; (3) when the medicine is being consumed, such as via a time stamp recorded by the activity monitor and/or associated mobile device; (4) where the medicine was taken, such as via location data generated from the activity monitor or a mobile device via GPS, a network location, or the like; and (5) how much of the medication is taken, such as through a known dosage, or through sensors detecting changes in volume, mass, or the like.

The data obtained through the activity monitor may be configured to be accessed through a monitoring network or system and be combined with other health monitoring services. For example, a user may subscribe to any number of health oriented websites or may own other health monitoring devices such as heart rate monitors, pedometers, sleep tracking devices, smart scales, etc. The information from the activity monitor may be associated with other data from such websites or devices to provide the user or a health care provider more information relating to the health of the user.

As one example, the monitoring system or the user's device might be configured to obtain information from a user's heart rate monitor. The system might detect a spike in a user's heartrate after medication was taken by the user (as determined by an output of the activity monitor). As a result, the system might warn the user to contact their physician or might automatically send a report to the physician. As another example, the system might detect changes in the weight of the user as obtained from an external system or device (such as an "e-scale" used by the user). The change in weight might also trigger warnings or might cause the monitor to indicate that a different amount of medication should be taken.

As another example, the user's device or the monitoring system may communicate with an external pharmacy computer or system. In one embodiment, the pharmacy may fill a prescription. Medicine information, dosage information or the like may be provided to the user's device or the monitoring system. For example, the monitoring system might be provided with information indicating that the user should take 1 pill 2 times daily. The monitoring system may then utilize that information to trigger alerts to the user and to correlate user activity from the activity monitor. As one example, the monitoring system may obtain information from the activity monitor which indicates that a user took an amount of medicine from the container (such as determined by change in mass, volume or the like) in the morning and evening of day 1, consistent with the prescription. If the activity monitor does not indicate activity, the monitoring system may provide an alert to the user (such as via the user's mobile device, etc.), consistent with the prescription.

In one embodiment, the monitoring system might also use activity monitoring data to trigger a refill request with the pharmacy. For example, the monitoring system might be provided with data from the pharmacy that 30 pills are provided. Once the activity monitor indicates that 30 activities correlating to the taking of those pills have been detected, the monitoring system might automatically report such to the pharmacy and/or request a refill.

Of course, the user's device and/or the monitoring system might be integrated with other systems. For example, a user might track their dietary intake via a dietary monitoring system (such as a web-based system). The user might link their account to such a system with the monitoring system, whereby the monitoring system can obtain information about the user's diet. This may cause the monitoring system to generate warnings (such as when the system detects that the user has eaten food which may cause a reaction to the medication or the like), to adjust the volume of medicine which should be taken (such as by informing the user and changing the programming associated with the activity monitor).

In some embodiments, a user may set up an account or otherwise input or provide user information (such as name of physician and contact info; emergency or family contact info; name of pharmacist and contact info, etc., where contact information might comprise a phone number, email address, etc.). Information obtained from the activity monitor(s) may be associated with the user or the user's account, such as with the monitoring system or the user's device. Further, the other information which is provided by the user might similarly be stored or associated. As one example, the monitoring system may create one or more data records which are associated with the user. The monitoring system may utilize those data records, for example, to locate contact information in order to alert the user's physician in the event of an overdose of medication, a detected reaction or the like. Similarly, the monitoring system might use the user's stored family information to providing medication reminders to the user and their designated family members.

In some embodiments, information may be input or provided by a user to their user device which is correlated or associated with the activity monitoring data. As one example, an activity monitor might include a keypad which allows a user to input a user ID or password. This information might be associated with other detected activity information and be provided to the user's device or the monitoring system, thus allowing to determine that the detected activity was performed by the user. However, in another embodiment, the activity monitor might detect an event, such as medication being removed from the container, and transmit that information to the user's device. The user's device might then prompt the user to confirm that they engaged in the activity or to enter a code, password or the like to identify themselves to thus confirm that the user engaged in the activity.

In general, aspects of features of the method and system might be implemented solely by the activity monitor(s). In other embodiments, some of the functionality might be implemented via one or more external devices, such as a user's device (computer, tablet, PDA, smart phone, etc.) and/or a remote system/server.

As indicated herein, in some embodiments, the activity monitor may simply include accelerometer(s) to detect movement or a mass measuring device. However, in other embodiments the activity monitor may include more complex technology to measure volumes of material within the container. In such an embodiment, the activity monitor can effectively notify a user when the dosage taken was too small, too large or just right. In addition, this embodiment of the activity monitor can detect when the contents are getting low and initiate or alert that it is time to refill the prescription. For instance, the activity monitor may include a sensor, such as a depth finder technology sensor, that can be used to determine the volume of contents. When the activity monitor is first installed, the sensor conducts an initial volume check. After each subsequent opening, the sensor again checks to content volumes. If an unusual change in volume is detected, or if no change is detected when a change was expected, and alert can be provided. Further the types of measuring or detection devices may, as indicated herein, vary. For example, newly developed "micro" detection devices may be utilized in order to minimize the size of the activity monitor.

Figure 12A:
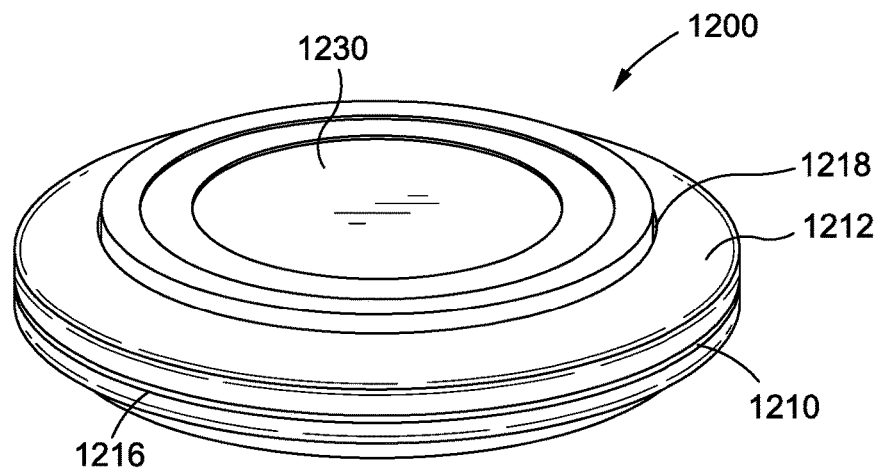
FIG. 12A and FIG. 12B show perspective views of a scale-type activity monitor, according to one exemplary embodiment.
Figure 12B:
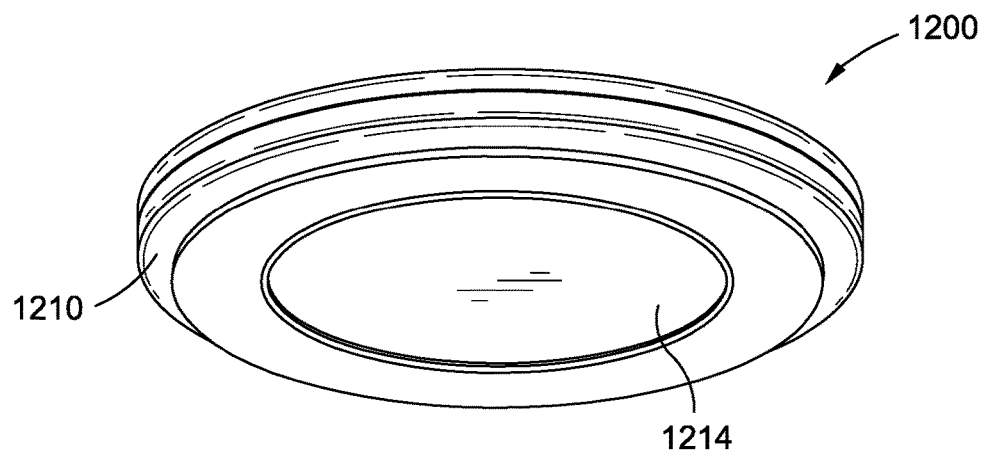

FIGS. 12A and 12B show one example of a scale that can comprise, be used in place of or be used in conjunction with, the above described activity monitor. In this embodiment, the scale 1200 is a self-contained activity reporting device which is configured to detect activity associated with a container and report such activities, such as to a separate device. In one embodiment, the scale 1200 is configured to detect activity associated with a container as represented by changes in its mass (such as when contents of the container are removed).

As illustrated, the scale 1200 includes a housing 1210 having a top portion 1212 and a bottom portion 1214. The top portion 1212 and bottom portion 1214 may be joined together in a manner which forms a seam 1216 about a side of the housing 1210. The top portion 1212 includes an opening 1218 that accommodates a loading member 1230.

Figure 13:
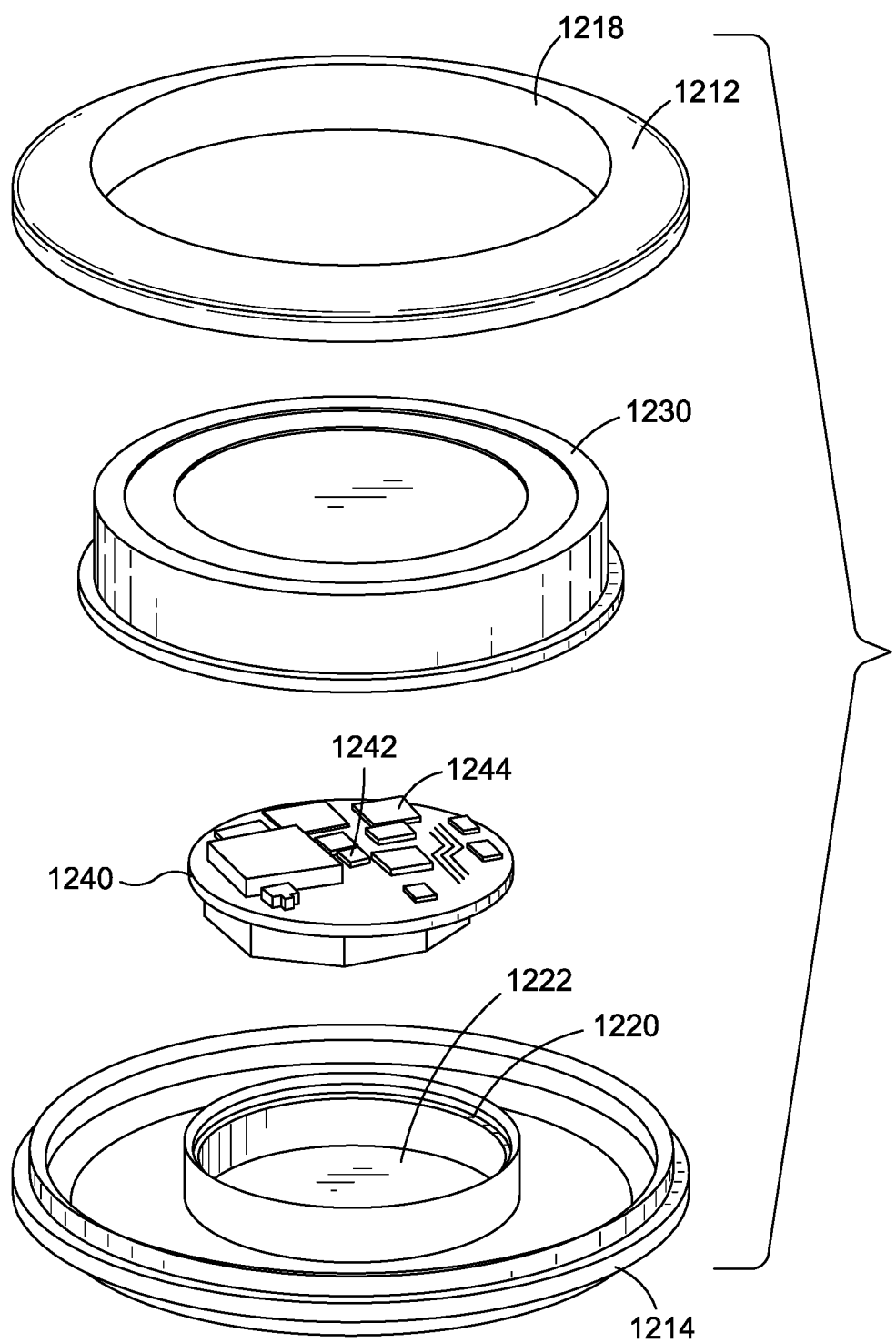
FIG. 13 shows an exploded view of the scale-type activity monitor shown in FIGS. 12A and 12B.

FIG. 13 shows an exploded view of the scale 1200 shown in FIGS. 12A and 12B. As illustrated in FIG. 13, the bottom portion 1214 of the housing includes an inner cylindrical flange 1220 forming a depression 1222. The depression is configured to receive a printed circuit board ("PCB") 1240. The PCB 1240 comprises a sensor 1242, such as a pressure transducer; load cells such as hydraulic, pneumatic, piezoelectric, capacitive, or strain gauge load cells; or other types of force sensors capable of measuring a force that are now known or are later developed. The PCB 1240 further comprises circuitry 1244 such as a processor; a transmitter or transceiver for transmitting data to an external device, such as a mobile phone, via Wi-Fi, Bluetooth, NFC, or the like; a memory; and other required devices, similar to those described above. The PCB 1240 further comprises a battery 1246 that powers the PCB during use.

Figure 14:
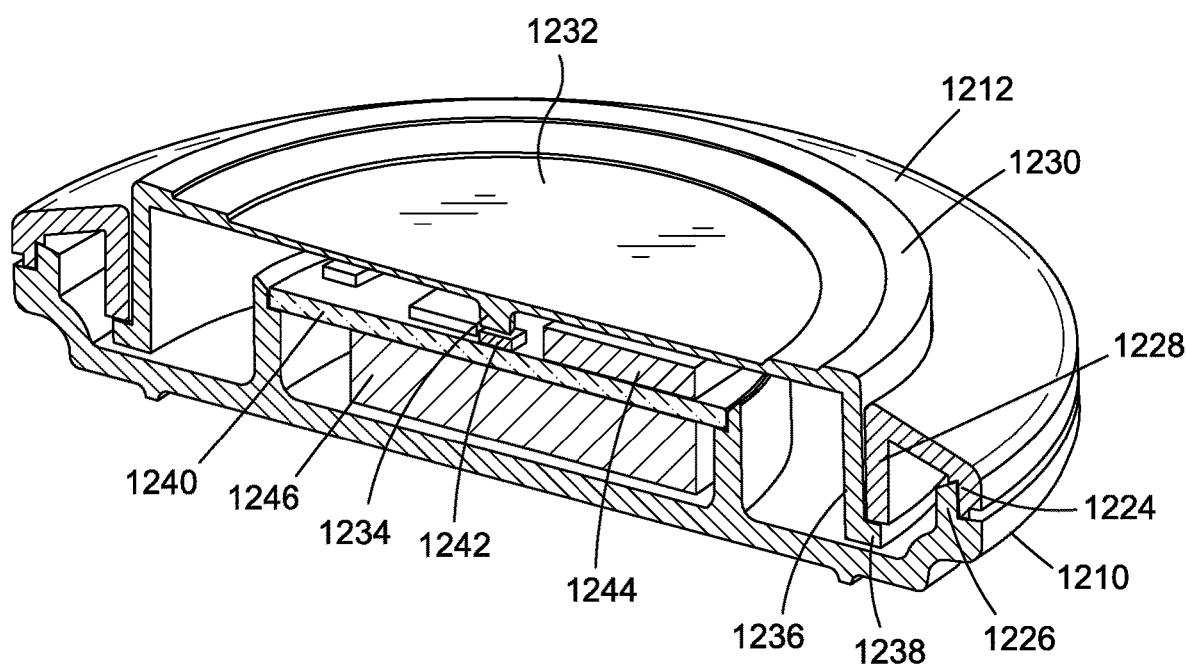
FIG. 14 shows a section view of the scale-type activity monitor shown in FIGS. 12A and 12B.

FIG. 14 shows a cross-section view of the scale described in FIGS. 12A-13. As shown in FIG. 14, the loading member 1230 includes a flexible member 1232. In this example, the flexible member 1232 is configured to support a prescription bottle of medicine. However, the flexible member 1232 may be configured to support any container having contents which are monitored by the activity monitor. On a lower surface of the flexible member 1232, there is a plunger 1234. The plunger 1234 is configured to come into contact with or other actuate the sensor 1242 of the PCB 1240. That is, when a load is placed onto the loading member 1230, the flexible member 1232 deforms and the plunger 1234 comes into contact with and/or exerts increased pressure on the sensor 1242. Of course, instead of flexing or deforming under load, the flexible member 1232 might be generally rigid and be configured to move, such as up and down relative to the PCB 1240.

The loading member 1230 further comprises a cylindrical extending member 1236 that has an annular flange 1238. The top portion 1212 of the housing 1210 includes a downward, cylindrical extension 1228 that surrounds the cylindrical extending member 1236. The annular flange 1238 is configured to sit below the cylindrical extension 1228 of the top portion 1212 and on an inner surface of the bottom portion 1214, thereby holding the loading member 1230 in place.

As shown in FIG. 14, the housing 1210 is joined where an upper cylindrical flange 1224 of the top portion 1212 joins a lower cylindrical flange 1226 of the bottom portion 1214. The flanges 1224, 1226 may be joined together via a snap fit, force fit, adhesive, welding, or the like.

The scale 1200 may thus be used as an activity monitor or may be used in combination with the above described activity monitor. Specifically, the scale 1200 measures the mass of the prescription bottle placed on the scale 1200, including the contents of the bottle. When contents are taken out of the bottle, the scale 1200 can determine a change in mass of the bottle and its associated contents, and can thus determine that contents have been removed by a decrease in the mass of the bottle, and can thus also determine the amount of medicine taken or removed. The mass data obtained by the scale 1200 may be transmitted via the communication interface (transmitter or transceiver) to the activity monitor or to another device, such as a mobile, phone, as part of a schedule, reminder, or alarm system, consistent with the processes already described herein. In this manner, the scale 1200 monitors the activity associated with the contents of the bottle. In one embodiment, the scale 1200 may be mounted to the bottom of a medicinal container, such as by being connected thereto, for this purpose.

FIGS. 15A and 15B show a scale 1500 that may be connected to a bottle or container, such as by being built into or inserted into such a bottle or container, for detecting or measuring the change of contents stored in the bottle. Similar to the scale 1200, the scale 1500 may be used to measure the mass of the bottle and the contents therein to track a change in mass of the contents as a user removes contents from the bottle.

As shown in FIGS. 15A and 15B, the scale 1500 may be disposed in a bottom portion of a bottle 1560, such as a prescription medicine bottle or container. The bottle 1560 may include a cap 1570. The cap 1570 may be a standard cap or may comprise the activity monitor described above. The scale 1500 may include a lower housing 1510, a PCB 1530, a battery 1540, and circuitry 1550.

Figure 16:
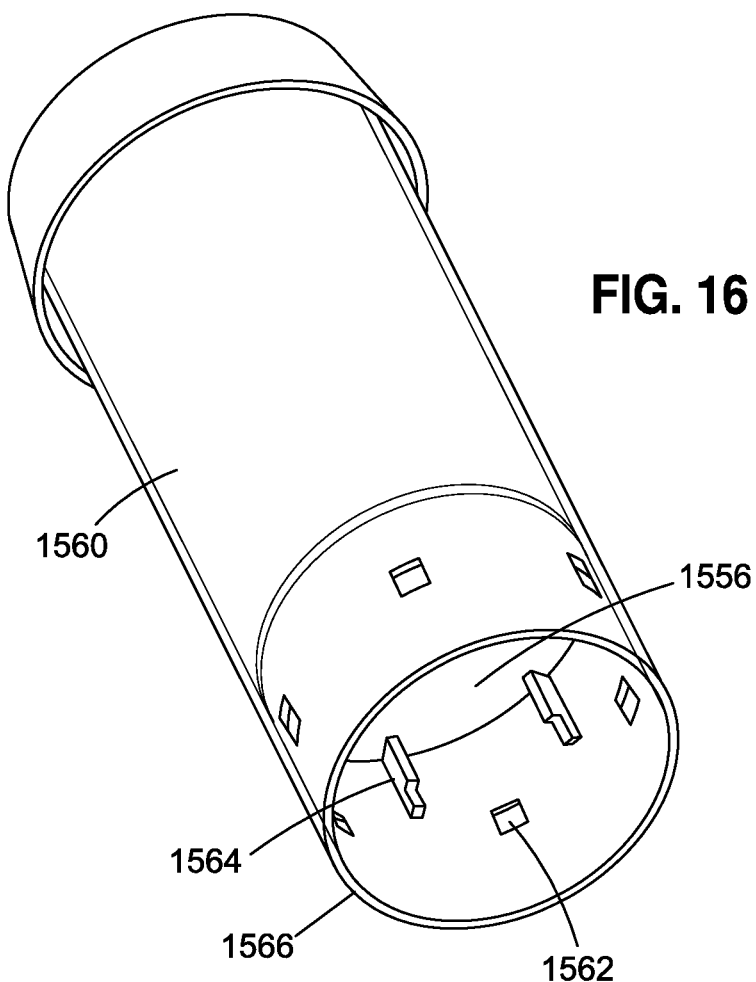
FIG. 16 shows an exemplary bottle configured to receive the scale-type activity monitor shown in FIGS. 15A and 15B.
Figure 17:
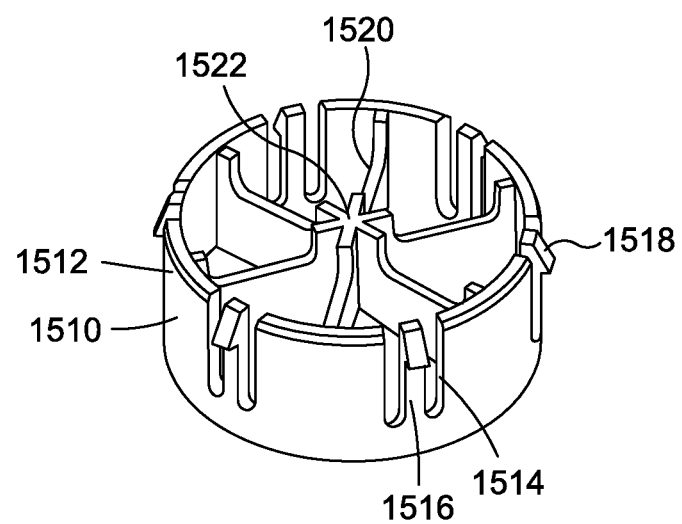
FIG. 17 shows an exemplary housing of the scale-type activity monitor shown in FIGS. 15A and 15B.

FIG. 16 shows a perspective view of the bottle according to one exemplary embodiment. In FIG. 16, the bottle 1560 comprises an open bottom 1566. Near the bottom 1566 of the bottle, there are a plurality of cutouts 1562. The cutouts 1562 are configured to retain the housing 1510 within the bottle 1560, as described in more detail below. The bottle 1560 further comprises a plurality of seating ribs 1564. The seating ribs 1564 are configured to seat onto the PCB 1530, as described in more detail below.

The housing 1510 comprises a bottom surface 1511 with a cylindrical wall 1512 extending upwards from the bottom surface 1511. The cylindrical wall 1511 includes a plurality of cutouts 1514. A flexible projection 1516 extends upwardly in the cutout 1514. Each projection 1516 may extend outwardly of the cylindrical wall 1512, so as to project into or contacts a bottle, as disclose below. At a top end of the projection 1516, there is a catch 1518 that extends outwardly from the cylindrical wall 1512. The housing 1510 further comprises a number of reinforcing ribs 1520 that extend from a central plunger 1522 to the cylindrical wall. The plunger 1522 is raised with respect to the ribs 1520.

Figure 18:
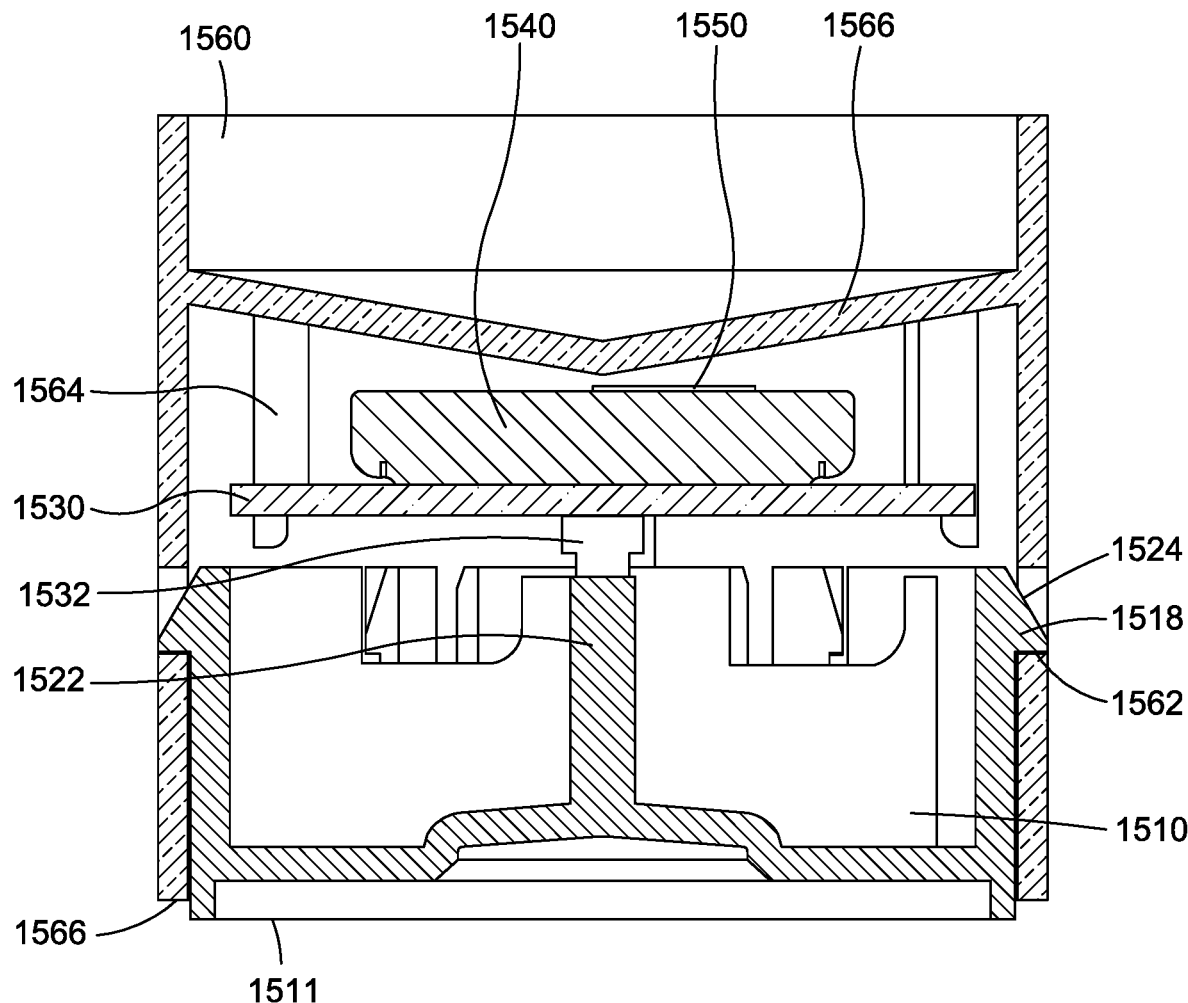
FIG. 18 shows a section view of the scale-type activity monitor shown in FIGS. 15A and 15B.

FIG. 18 shows a section view of a bottle or container having the integrated or internal scale, according to one exemplary embodiment. In FIG. 18, the housing 1510 is attached to the bottle 1560 by the catch 1518 being inserted into the cutout 1562. In one embodiment, the catch 1518 has an inclined surface 1524 that biases the flexible projection 1516 inward when the housing 1510 is inserted into the bottom 1566 of the bottle 1560. The flexible projection 1516 returns to its original configuration when the catch 1518 reaches the cutout 1562, thereby inserting the catch 1518 into the cutout 1562.

With the housing 1510 inserted into the bottom 1566 of the bottle 1560, the seating ribs 1564 are disposed so as to rest on the PCB 1530 of the scale 1500. In this configuration, the PCB 1530 supports the mass of the bottle 1560 along with its contents. As shown in FIG. 18, the seating of the ribs 1564 on the PCB 1530 causes the bottom 1566 of the bottle 1560 to be disposed above the bottom surface 1511 of the housing 1510.

The PCB 1530 in this embodiment may be similar to the PCB 1240 shown in FIG. 14, and may include processors, memories, transceivers, and the like. The PCB 1530 comprises a sensor 1532 disposed on a bottom side of the PCB 1530. When the mass of the bottle 1560 is applied to the PCB 1530, the mass is transferred to the housing via the plunger 1522. The plunger 1522 is in contact with the sensor 1532 to thereby measure the mass of the bottle 1560 and contents therein. The contents in the bottle are held on a platform 1566 disposed within the bottle 1560 above the scale 1500.

The scale 1500 may thus be used as an activity monitor or be used in combination with the above described activity monitor. Specifically, the scale 1500 measures the mass of the bottle within which the scale 1200 is inserted. When contents are taken out of the bottle, the scale tracks that a portion of the contents have been removed by a decrease in the mass of the bottle. The mass data obtained by the scale 1200 may be transmitted to the activity monitor or to an external device, such as a mobile, phone, as part of a schedule, reminder, or alarm system, consistent with the processes already described herein. In this manner, the scale 1500 monitors the activity associated with the contents of the bottle.

Figure 19A:
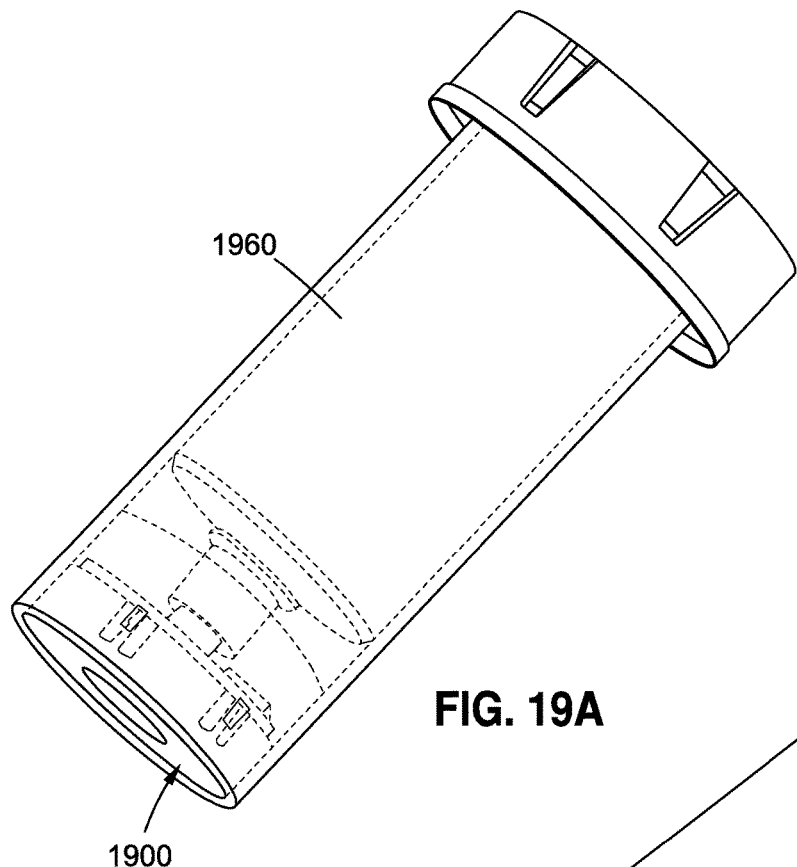
FIG. 19A and FIG. 19B show a scale-type activity monitor embedded within a container to measure the mass of any contents therein, according to one exemplary embodiment.
Figure 19B:
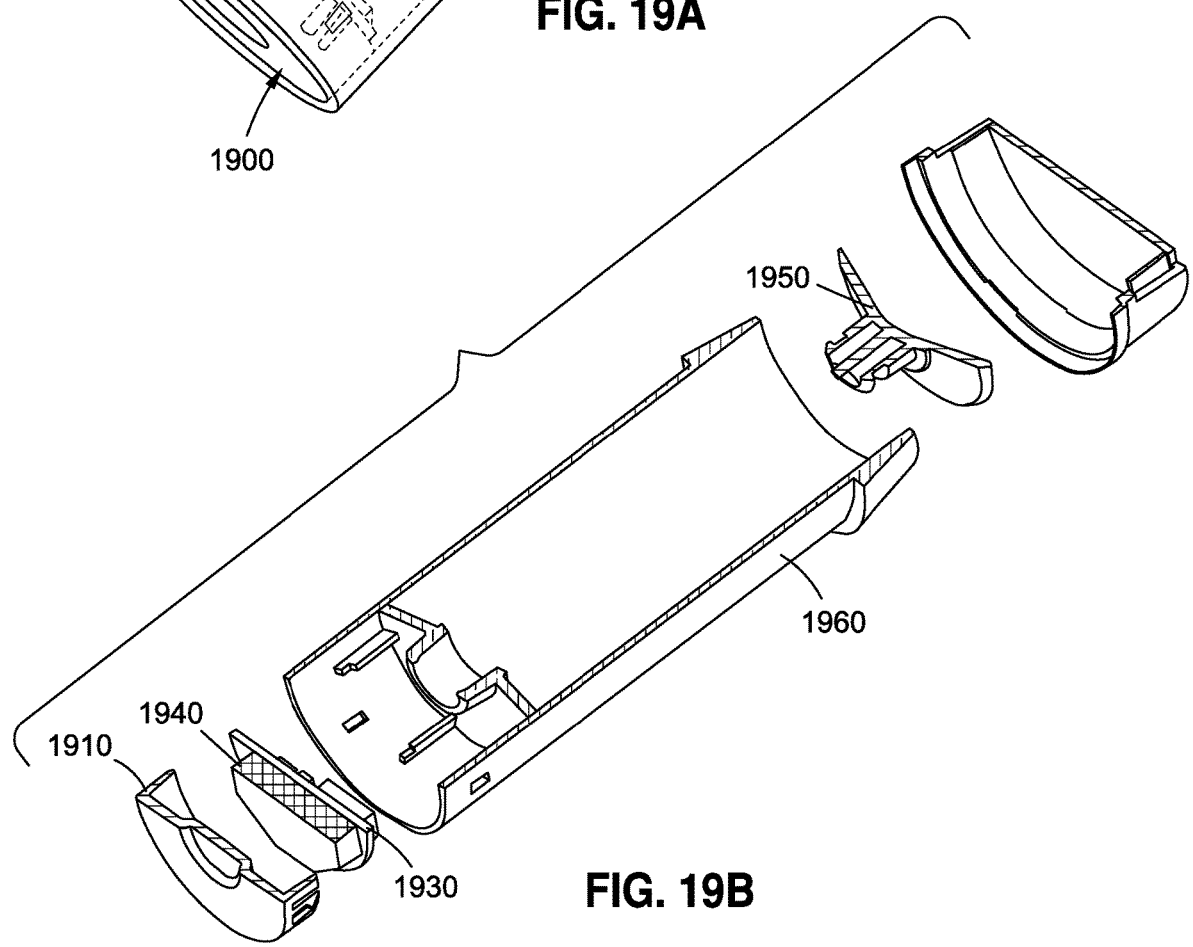

FIGS. 19A and 19B show a scale 1900 and container wherein the scale is configured to detect or measures the mass of just contents of a container. As shown in FIGS. 19A and 19B, the scale 1900 may be used to measure the mass of the contents held within a bottle 1960. The scale 1900 comprises a housing 1910, a PCB 1930 (with a transmitter/transceiver, etc.), a battery 1940, and a weighing platform 1950.

FIG. 20 shows a bottle for use with the scale 1900, according to one exemplary embodiment. The bottle 1960 comprises an open bottom 1966. Near the bottom 1966 are a number of cutouts 1962 that hold the scale 1900 within the open bottom 1966 of the bottle 1960. Further, there are a number of seating ribs 1964 to stabilize the bottle 1960 with respect to the scale 1900. An annular downward projection 1968 extends downward from a conical member 1976 disposed within the bottle 1960. The downward projection 1968 includes a pair of cutouts 1970 with flexible extensions 1972 extending within the cutouts 1970. Each of the extensions 1972 includes a retention snap 1974 that attaches to the scale 1900 as will be described in more detail below.

FIG. 21 shows a platform portion of a scale, according to one exemplary embodiment. The platform 1950 comprises a loading plate 1951 having a top loading surface 1952 and a bottom surface 1954. A column 1955 extends downward from the bottom surface 1954. The column 1955 comprises a groove 1957 that interacts with the retention snaps 1974 described above. The distal end 1958 of the column comprises an inclined surface that allows for a snap fit connection, and a plunger 1956.

FIG. 22 shows a housing for the scale, according to one exemplary embodiment. The housing 1910 comprises a cylindrical wall 1912 extend upwards from the bottom surface 1911 of the housing 1910. The cylindrical wall 1912 comprises a number of cutouts 1914 with flexible extensions 1916 extending therein. The flexible extensions 1916 comprise snaps 1918 for attaching to the bottle 1960. Specifically, the snaps interact with the cutouts 1962 to hold the housing 1910 within the open bottom 1966 of the bottle 1960.

Figure 23:
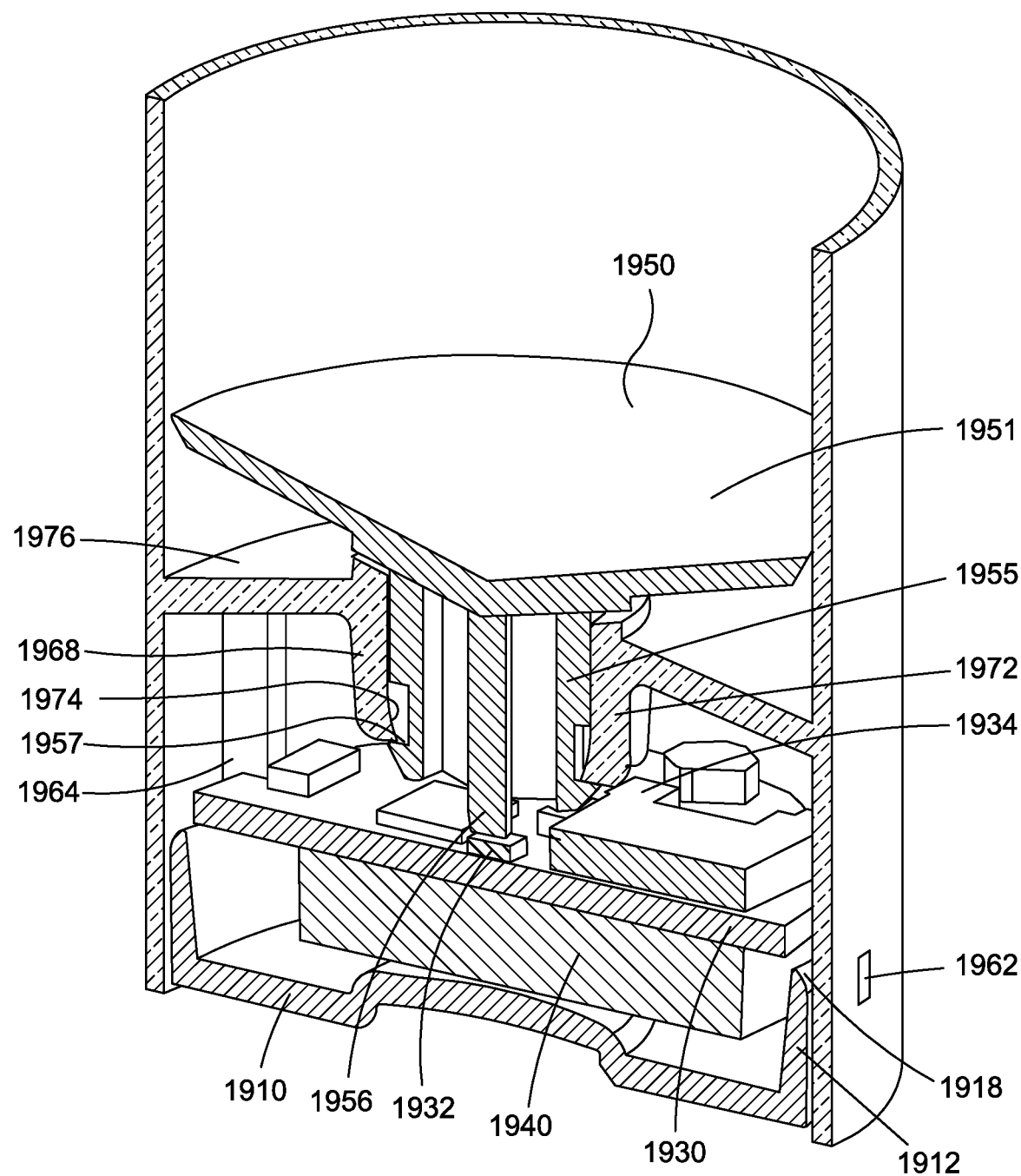
FIG. 23 shows a section view of the scale-type activity monitor shown in FIGS. 19A and 19B.

FIG. 23 shows a cross-section view of the bottle and scale according to one exemplary embodiment. As shown in FIG. 23, the housing 1910 is snapped into the bottle 1960 via the snap 1918 and cutouts 1962. The battery 1940 is disposed in the housing 1910 within the cylindrical wall 1912. The PCB 1930 is disposed above the battery 1940, and the seating ribs 1964 is abutted against the PCB 1930 to hold it in position.

The PCB 1930 is similar to PCBs 1530 and 1240 described above, and includes a sensor 1932 and circuitry 1934. The sensor 1932 may be any sensor capable of detecting pressure or a force acting against the sensor. The circuitry 1934 includes a processor, memories, and transceivers as described above to work as or in conjunction with the activity monitor described herein.

The plate 1951 of the platform 1950 is disposed above the conical member 1976. The column 1955 of the loading platform 1950 extends through the annular downward extension 1968 with the retention snaps 1974 catching the annular groove 1957. The plunger 1956 is configured to come into contact with and actuate the sensor 1932. Accordingly, when contents are put into the bottle 1960, the contents rest on the loading platform 1950. The mass of the contents on the platform 1950 is transferred through the plunger 1956 to the sensor 1930, thereby measuring the mass of the contents.

The scale 1900 may thus be used as an activity monitor or in combination with the above described activity monitor. Specifically, the scale 1900 measures the mass of the contents of the bottle in which it is placed. When contents are taken out of the bottle, the scale tracks that a portion of the contents have been removed by a decrease in the mass of the contents. The mass data obtained by the scale 1900 may be transmitted to the activity monitor or to an external device, such as a mobile, phone, as part of a schedule, reminder, or alarm system, consistent with the processes already described herein. In this manner, the scale 1900 monitors the activity associated with the contents of the bottle. One advantage of the scale of this embodiment is that it directly detects or measures the mass of just the contents of the bottle or container. Thus, for example, the scale would not detect a medicinal activity if the user simply removed the cap of the container because while such would change the mass of the container, that action would not change the mass of the medicinal contents.

The activity monitor can be provided and marketed in a variety of manners. For instance, in one embodiment, the activity monitors may be disposable devices that are thrown away with the empty medicine bottles. In such an embodiment, programming can be simplified as the device will be used with only one medicine for a limited period of time. In such an embodiment, the activity monitor may be sold by itself, or in groups, such as 4 packs and 6 packs, with the batteries already installed but disabled by use of a plastic isolating strip that can be removed when desired for operation. In other embodiments, the activity monitor may include a replaceable or chargeable battery and can be reused and reprogrammed multiple times.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A content monitoring apparatus configured to monitor a container, the content monitoring apparatus comprising:
   a housing that is mounted into and disposed within an open bottom of the container; and
   a scale disposed on the housing which detects a weight of contents within the container;
   wherein the housing comprises an outer wall that fits within the bottom of the container, and a plunger that interacts with a weight sensor of the scale, the plunger supporting the container and the contents therein.

2. The content monitoring apparatus of claim 1 further comprising a processing unit communicatively coupled to the scale, the processing unit comprising a transceiver that communicates with a computing device to send information to the computing device regarding activity associated with the container as detected by the scale.

3. The content monitoring apparatus of claim 2 wherein the computing device comprises a mobile device of a user.

4. The content monitoring apparatus of claim 1, wherein the scale comprises a pressure activated detector.

5. The content monitoring apparatus of claim 1, wherein the scale detects the weight of contents within the container by sensing a weight of both the container and the contents.

6. The content monitoring apparatus of claim 1, wherein:
the housing further comprises a printed circuit board on which a processing unit and the weight sensor are disposed,
the container comprises seating ribs on an interior surface, and
the seating ribs are disposed on the printed circuit board to transfer the weight of the container and the contents therein to the printed circuit board, the printed circuit board being supported by the plunger of the housing through the interaction of the weight sensor and the plunger.

7. A content monitoring apparatus configured to monitor a container, the content monitoring apparatus comprising:
a housing comprising an annular opening;
a scale comprising a battery and a printed circuit board disposed within the housing, the printed circuit board comprising a weight sensor and a processing unit; and
a loading member comprising a flexible member disposed within the annular opening of the housing, the loading member contacting the weight sensor,
wherein the loading member is configured such that the container may rest thereon and a weight of the container is transferred through the flexible member to the weight sensor to detect a mass of the container and contents therein.

8. The content monitoring apparatus of claim 7, wherein the housing comprises a top portion and a bottom portion, the annular opening is disposed in the top portion, the bottom portion comprises an annular flange forming a depression, and the battery and the printed circuit board are disposed within the depression.

9. The content monitoring apparatus of claim 7, wherein the processing unit comprises a transceiver that communicates with a computing device to send information to the computing device regarding activity associated with the container as detected by the scale.

10. The content monitoring apparatus of claim 9 wherein the computing device comprises a mobile device of a user.

11. The content monitoring apparatus of claim 7, wherein the scale comprises a pressure activated detector.

12. The content monitoring apparatus of claim 7, wherein the loading member further comprises a plunger attached to the flexible member, the plunger being configured to interact with the weight sensor.

13. The content monitoring apparatus of claim 7, wherein the flexible member comprises a cylindrical extension extending from edges of the flexible member, and an annular flange disposed at an end of the cylindrical extension, the annular flange locking the flexible member to the housing.

14. A content monitoring apparatus configured monitor a container, the content monitoring apparatus comprising:
a housing that is mounted into and disposed within an open bottom of the container; and
a scale disposed on the housing which detects a weight of contents within the container;
wherein the housing further comprises a weighing platform, the weighing platform including a column extending from a lower surface of the weighing platform, the column comprising a plunger that interacts with a weight sensor of the scale to detect the weight of the contents within the container that are disposed on a loading surface of the weighing platform;
whereby the scale detects the weight of the contents within the container independent of a weight of the container.

15. The content monitoring apparatus of claim 14, wherein the housing comprises a battery and a printed circuit board on which a processing unit and the weight sensor are disposed, the plunger of the weighing platform being configured to seat on the weight sensor disposed on the printed circuit board.

* * * * *